(12) United States Patent
Kai et al.

(10) Patent No.: US 8,170,416 B2
(45) Date of Patent: May 1, 2012

(54) OPTICAL SWITCHING DEVICE

(75) Inventors: Yutaka Kai, Kawasaki (JP); Yasuhiko Aoki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1026 days.

(21) Appl. No.: 12/076,856

(22) Filed: Mar. 24, 2008

(65) Prior Publication Data

US 2009/0003827 A1   Jan. 1, 2009

(30) Foreign Application Priority Data

Jun. 8, 2007   (JP) ................................. 2007-152823

(51) Int. Cl.
  *H04J 14/00* (2006.01)
(52) U.S. Cl. .............................. 398/45; 398/51; 398/54
(58) Field of Classification Search ............... 398/43–59, 398/97
  See application file for complete search history.

(56) References Cited

U.S. PATENT DOCUMENTS

| | | | |
|---|---|---|---|
| 5,495,356 A | | 2/1996 | Sharony et al. |
| 6,510,260 B2 * | | 1/2003 | Chen et al. ........................ 385/17 |
| 7,079,723 B2 * | | 7/2006 | Bortolini et al. ................ 385/16 |
| 7,106,967 B2 * | | 9/2006 | Handelman ...................... 398/47 |
| 7,864,757 B2 * | | 1/2011 | Hall et al. ...................... 370/388 |
| 2006/0222361 A1 * | | 10/2006 | Aoki ................................ 398/51 |

FOREIGN PATENT DOCUMENTS

| | | |
|---|---|---|
| JP | 5-56006 A | 3/1993 |
| JP | 6-319162 A | 11/1994 |
| JP | 9-24709 A | 9/1997 |
| JP | 2006-279362 A | 10/2006 |

OTHER PUBLICATIONS

Japanese Office Action mailed on May 24, 2011 for corresponding Japanese Application No. 2007-152823, with Partial English-language Translation.
Patent Abstract of Japan, Publication No. 11-146430, Publication date May 28, 1999.
Patent Abstract of Japan, Publication No. 2007-259333, Publication date Oct. 4, 2007.

* cited by examiner

*Primary Examiner* — M. R. Sedighian
(74) *Attorney, Agent, or Firm* — Fujitsu Patent Center

(57) ABSTRACT

An optical switching device the size and costs of which are reduced by decreasing the number of switching elements and which can flexibly accommodate the expansion of the number of ports. An optical demultiplexing section has $2^n$ (n=1, 2, 3, . . . ) input ports and $2^m$ (m>n) output ports and includes demultiplexing couplers for demultiplexing input optical packets. A switch fabric section includes optical gate elements for switching optical packets outputted from the optical demultiplexing section by switch drive control. An optical multiplexing section has $2^m$ input ports and $2^n$ output ports and includes multiplexing couplers for multiplexing the optical packets which pass through the optical gate elements. A scheduler exercises control over an entire optical packet switching process.

8 Claims, 18 Drawing Sheets

| DEVICE | DEMULTI-PLEXING COUPLER | EDFA | DEMULTI-PLEXING COUPLER | SOA AT FIRST STAGE | COUPLER WITH 8 INPUTS | SOA | 4-TO-1 MULTI-PLEXING COUPLER | SOA | COUPLER WITH 8 INPUTS | SOA AT FINAL STAGE |
|---|---|---|---|---|---|---|---|---|---|---|
| CONVENTIONAL 256 X 256 SWITCH | 256 (1:16) | 256+16 ×256 | 16×256 (1:16) | 256×256 | 32×256 (8:1) | 32×256 (SOA 121 AT SECOND STAGE) | 8×256 | 8×256 (SOA 121 AT THIRD STAGE) | 256 (8:1) | 256 |
| 256 X 256 SWITCH ACCORDING TO PRESENT INVENTION | 2×64 (2:8) | 4×64+ 16×64 | 8×64 (2:8) | 64×64 | 8×64 (8:2) | 0 | 0 | 16×64 (SOA 8 AT SECOND STAGE) | 2×64 (8:2) | 4×64 |

FIG. 11

|  | NUMBER OF SOAS | NUMBER OF EDFAS | NUMBER OF COUPLERS |
|---|---|---|---|
| CONVENTIONAL 256 X 256 SWITCH | 76, 032 | 4, 352 | 14, 848 |
| 256 X 256 SWITCH ACCORDING TO PRESENT INVENTION | 5, 120 | 1, 280 | 1, 280 |

⇧ REDUCED TO ABOUT ONE FIFTEENTH   ⇧ REDUCED TO ABOUT ONE THIRD   ⇧ REDUCED TO ABOUT ONE TWELFTH

FIG. 12

| SENDING SECTION ADDRESS | DEMULTI- PLEXING UNIT NUMBER | INPUT PORT NUMBER | SIGNAL WAVELENGTH (ITU GRID NUMBER) | RECEIVING SECTION ADDRESS | MULTI- PLEXING UNIT NUMBER | OUTPUT PORT NUMBER | USE STATE | ALARM |
|---|---|---|---|---|---|---|---|---|
| 0x804050 | S0001 | 1 | C12 | 0x904050 | S0000 | 50 | USED | — |
| 23A56FF3 | S0001 | 5 | C4 | 23B56FF3 | S0003 | 38 | USED | — |
| K26F9U/0 | S0004 | 9 | C6 | K27F9U/0 | S0002 | 249 | NOT USED | ABNORMALITY IN TEMPERATURE |
| ..... | ..... | ..... | ..... | ..... | ..... | ..... | ..... | ..... |
| XXXXXXX | S0003 | 256 | C40 | XXXXXXX | S0001 | 202 | USED | — |

T1 CONNECTION MANAGEMENT TABLE

FIG. 15

T2 INPUT-SIDE COLLISION MANAGEMENT TABLE

| INPUT-SIDE COLLISION GROUP | INPUT PORT NUMBER PRIORITY 1 | INPUT PORT NUMBER PRIORITY 2 | INPUT PORT NUMBER PRIORITY 3 | INPUT PORT NUMBER PRIORITY 4 | ...... | INPUT PORT NUMBER PRIORITY n |
|---|---|---|---|---|---|---|
| GROUP 1 | 1 | 2 | 3 | 4 | — | — |
| GROUP 2 | 5 | 6 | 7 | 8 | — | — |
| GROUP 3 | 9 | 10 | 11 | 12 | — | — |
| ----- | ----- | ---- | ---- | ----- | ----- | ----- |
| GROUP 63 | 249 | 250 | 251 | 252 | — | — |
| GROUP 64 | 253 | 254 | 255 | 256 | — | — |
| GROUP 65 | — | — | — | — | — | — |

FIG. 16

| OUTPUT-SIDE COLLISION GROUP | OUTPUT PORT NUMBER PRIORITY 1 | OUTPUT PORT NUMBER PRIORITY 2 | OUTPUT PORT NUMBER PRIORITY 3 | OUTPUT PORT NUMBER PRIORITY 4 | ...... | OUTPUT PORT NUMBER PRIORITY n |
|---|---|---|---|---|---|---|
| GROUP 1 | 1 | 2 | — | — | — | — |
| GROUP 2 | 3 | 4 | — | — | — | — |
| GROUP 3 | 5 | 6 | — | — | — | — |
| ----- | ----- | ---- | ---- | ----- | ----- | ----- |
| GROUP 127 | 249 | 250 | — | — | — | — |
| GROUP 128 | 255 | 256 | — | — | — | — |
| GROUP 129 | — | — | — | — | — | — |

T3 OUTPUT-SIDE COLLISION MANAGEMENT TABLE

FIG. 17

OPTICAL SWITCHING DEVICE

CROSS-REFERENCE TO RELATED APPLICATIONS

This application is based upon and claims the benefits of priority from the prior Japanese Patent Application No. 2007-152823, filed on Jun. 8, 2007, the entire contents of which are incorporated herein by reference.

BACKGROUND OF THE INVENTION (1) Field of the Invention

This invention relates to an optical switching device and, more particularly, to an optical switching device for switching an optical packet (optical signal).

(2) Description of the Related Art

Various systems are devised as next generation optical access networks for transmitting an optical signal to a subscriber system without converting the optical signal into an electrical signal. For example, a broadband passive optical network (B-PON) in which an asynchronous transfer mode (ATM) frame is sent, an Ethernet (registered trademark) passive optical network (E-PON) in which an Ethernet frame is sent, a GE-PON in which Gigabit Ethernet is applied, and the like are devised. International standardization project is being carried out.

Unlike active double star (ADS) networks in which active elements for performing an electrical/optical conversion are used, only passive optical components are used in these PON systems. Accordingly, end-to-end optical networks can be realized at low costs. The introduction of WDM-PONs in which a wavelength division multiplex (WDM) signal is used has also been examined in order to realize larger capacity.

Attention is riveted on a semiconductor optical amplifier (SOA), which is an optical element, in order to build a flexible optical wideband network. With an SOA, optical signal loss is light and high-speed switching is performed. By connecting SOAs at many stages as switching elements, an N×N switch with N inputs and N outputs can be formed. As a result, high-speed switching of an optical packet can be performed.

Conventionally, an optical switch including a demultiplexer for demultiplexing an optical signal into n signal components having different wavelengths, delay elements for assigning different delays to the demultiplexed signal components, and a wavelength conversion module for wavelength-converting the delayed signal components is proposed (see, for example, Japanese Patent Laid-Open Publication No. Hei11-146430, paragraph Nos. [0015]-[0019] and FIG. 1).

With a conventional N×N switch, however, an increase in the number of connection ports and the scale N of the switch causes a rapid increase in the number of necessary switching elements (SOAs) in proportion to the number of the connection ports. Therefore, it is difficult to miniaturize a device or reduce the costs of a device.

Furthermore, if a small-scale switch is installed at the beginning and is switched later to a large-scale switch at the time of an increase in the number of connections, it is difficult to smoothly upgrade the conventional N×N switch. It was necessary to replace a switch fabric section or the switch itself.

SUMMARY OF THE INVENTION

The present invention was made under the background circumstances described above. An object of the present invention is to provide an optical switching device in which only a small number of switching elements is used for realizing miniaturization and a low coat and the scale of which can easily be increased in the case of increasing the number of connection ports.

In order to achieve the above object, an optical switching device for switching optical packets is provided. This optical switching device comprises an optical demultiplexing section with $2^n$ (n=1, 2, 3, . . . ) input ports and $2^m$ (m>n) output ports including demultiplexing couplers for demultiplexing input optical packets, a switch fabric section including optical gate elements for switching optical packets outputted from the optical demultiplexing section by switch drive control, an optical multiplexing section with $2^m$ input ports and $2^n$ output ports including multiplexing couplers for multiplexing the optical packets which pass through the optical gate elements, and a scheduler for exercising control over an entire optical packet switching process.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 11 is a view showing the necessary number of each component included in the 256×256 switches.

FIG. 12 is a view showing the total number of devices required for each function in the 256×256 switches.

FIG. 15 is a view showing an example of a connection management table.

FIG. 16 is a view showing an example of an input-side collision management table.

FIG. 17 is a view showing an example of an output-side collision management table.

DESCRIPTION OF THE PREFERRED EMBODIMENTS

Figure 1:
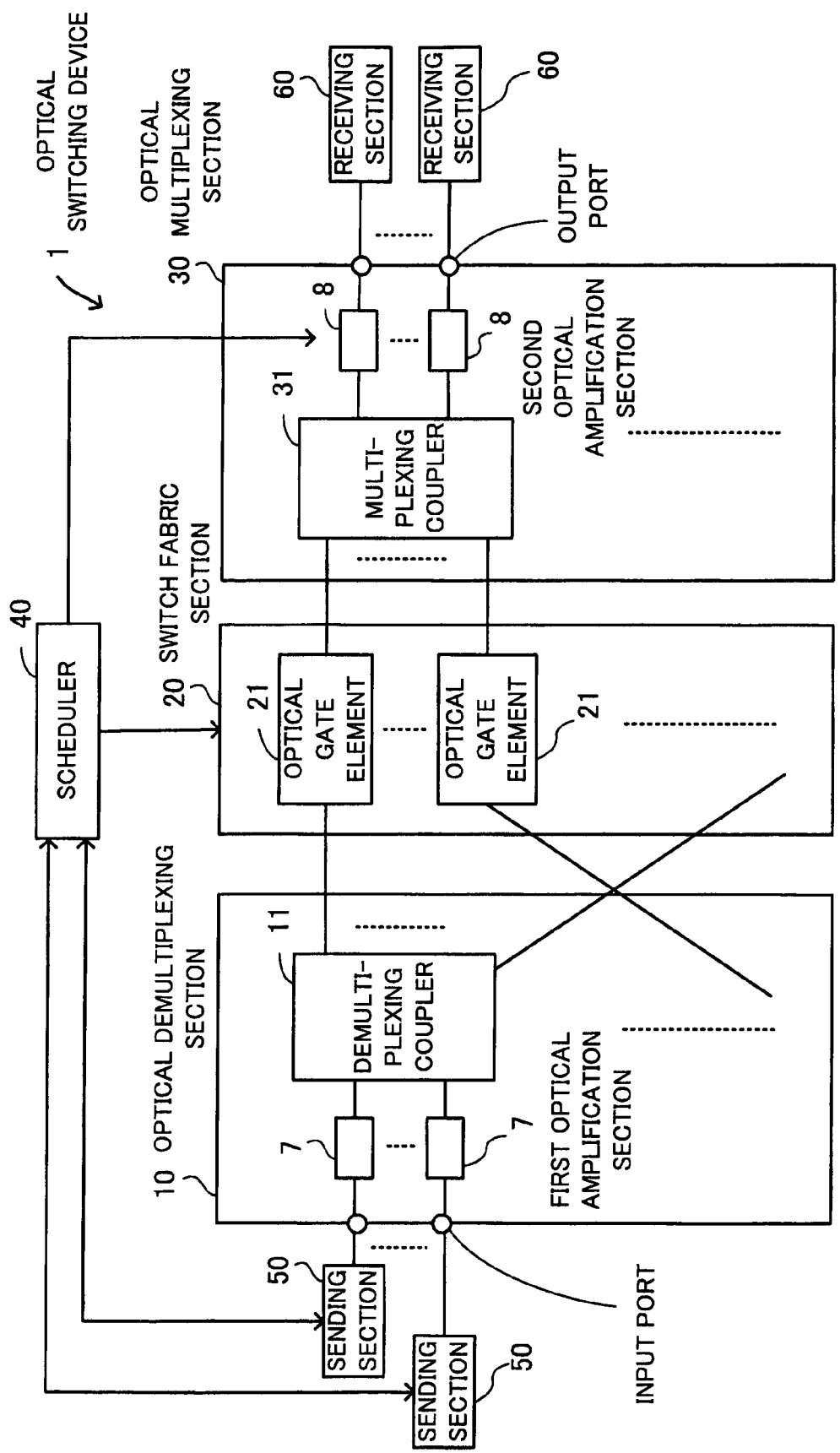
FIG. 1 is a view for describing the principles underlying an optical switching device according to the present invention.

Embodiments of the present invention will now be described with reference to the drawings. FIG. 1 is a view for describing the principles underlying an optical switching device according to the present invention. An optical switching device 1 comprises an optical demultiplexing section 10, a switch fabric section 20, an optical multiplexing section 30, a scheduler 40, sending sections 50, receiving sections 60, first optical amplification sections 7, and second optical amplification sections 8 and switches an optical packet.

The optical demultiplexing section 10 has $2^n$ (n=1, 2, 3, ...) input ports and $2^m$ (m>n) output ports and includes demultiplexing couplers 11 for demultiplexing input optical packets. m>n, so the number ($2^m$) of the output ports is larger than the number ($2^n$) of the input ports.

The switch fabric section 20 includes optical gate elements (SOAs) 21 for switching optical packets outputted from the optical demultiplexing section 10 by switch drive control from the scheduler 40.

The optical multiplexing section 30 has $2^m$ input ports and $2^n$ output ports and includes multiplexing couplers 31 for multiplexing the optical packets which pass through the SOAs 21. m>n, so the number ($2^m$) of the input ports is larger than the number ($2^n$) of the output ports. The scheduler 40 exercises control over an entire optical packet switching process (details of, for example, control of optical packet sending timing exercised by the scheduler 40 will be described later in FIGS. 13 and 14).

The sending sections 50 are connected to input ports of the demultiplexing couplers 11 (it may safely be said that the sending sections 50 are connected to the input ports of the optical demultiplexing section 10) and send optical packets in accordance with instructions from the scheduler 40. Each sending section 50 may be a light-emitting source that generates and outputs an optical packet in accordance with instructions from the scheduler 40 to generate an optical packet, a device that has the E/O function of converting an electrical signal sent from a preceding stage into an optical signal in accordance with instructions from the scheduler 40 to send an optical packet, or the like. The receiving sections 60 are connected to output ports of the multiplexing couplers 31 (it may safely be said that the receiving sections 60 are connected to the output ports of the optical multiplexing section 30) and receive the optical packets outputted after switching.

The first optical amplification sections 7 are located at output stages, input stages, or input and output stages of the demultiplexing couplers 11 and amplify input light. For example, an erbium-doped fiber amplifier (EDFA) which is always excited while the device is operating is used as each first optical amplification section 7 (hereinafter each first optical amplification section 7 is referred to as an EDFA 7).

The second optical amplification sections 8 are located at output stages, input stages, or input and output stages of the multiplexing couplers 31 and perform optical amplification in accordance with instructions from the scheduler 40. For example, an SOA is used as each second optical amplification section 8 (hereinafter each second optical amplification section 8 is referred to as an SOA 8).

Figure 2:
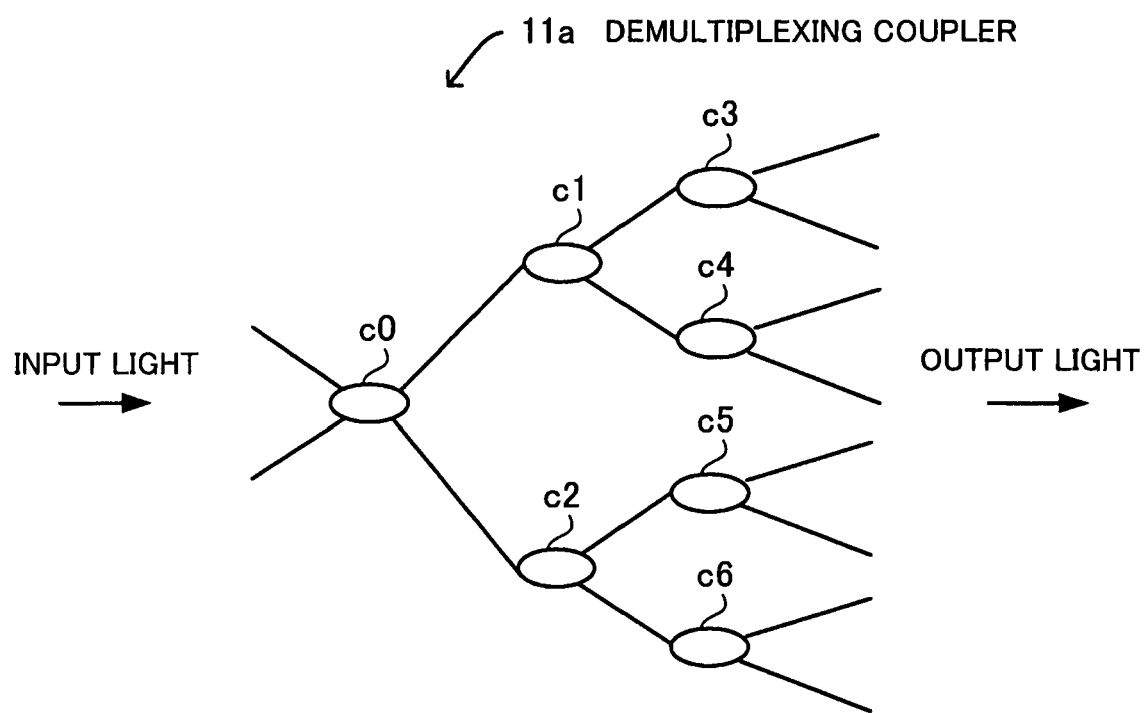
FIG. 2 is a view showing an example of the internal structure of a demultiplexing coupler.

The internal structure of the demultiplexing couplers 11 and the multiplexing couplers 31 will now be described. FIG. 2 is a view showing an example of the internal structure of a demultiplexing coupler. In FIG. 2, the structure of a 2-to-8 demultiplexing coupler 11a is shown. The demultiplexing coupler 11a includes a 2-to-2 coupler c0 and 1-to-2 couplers c1 through c6.

Two outputs from the coupler c0 are inputted to the couplers c1 and c2 respectively. Each of these outputs is divided in two. Four outputs from the couplers c1 and c2 are divided in two by the couplers c3 through c6 respectively and a total of eight outputs are obtained. A 2-to-4 demultiplexing coupler with two inputs and four outputs can be made up of the couplers c0 through c2.

From the internal structure of a demultiplexing coupler, the number of input ports and the number of output ports are powers of 2. Therefore, with the demultiplexing couplers 11 shown in FIG. 1, the number of the input ports is $2^n$ and the number of the output ports is $2^m$. However, it is necessary to make the number of the output ports of the demultiplexing coupler 11 greater than the number of the input ports of the demultiplexing coupler 11. Accordingly, m>n.

The same applies to a multiplexing coupler. By simply reversing the flow of light, the input and output sides of a demultiplexing coupler should be considered as output and input sides respectively. Accordingly, with the multiplexing couplers 31, the number of the input ports is $2^m$ and the number of the output ports is $2^n$. m>n, so the number of the input ports of the multiplexing coupler 31 is greater than the number of the output ports of the multiplexing coupler 31.

The case where the optical switching device 1 is used as an N×N switch with N ($N=2^k$, k=3, 4, 5, ...) inputs and N outputs will now be described. If the optical switching device 1 is used as an N×N switch, the optical demultiplexing section 10 includes $2^{k-n}$ demultiplexing couplers 11 each having $2^n$ (n<k) input ports and $2^{k-n}$ ($=2^k/2^n$, k−n=m) output ports.

In addition, the switch fabric section 20 includes ($2^{k-n} \times 2^{k-n}$) SOAs and the optical multiplexing section 30 includes $2^{k-n}$ multiplexing coupler 31 each having $2^{k-n}$ input ports and $2^n$ output ports.

If the optical switching device 1 is used as, for example, an 8×8 switch, N=8 and k=3. If n=1 (m=k−n=3−1=2, so m>n is satisfied), then the optical demultiplexing section 10 includes 4 ($=2^{3-1}$) demultiplexing couplers 11 each having 2 ($=2^1$) input ports and 4 ($=2^{3-1}$) output ports.

In addition, the switch fabric section 20 includes 16 ($=2^{3-1} \times 2^{3-1}$) SOAs and the optical multiplexing section 30 includes 4 ($=2^{3-1}$) multiplexing coupler 31 each having 4 ($2^{3-1}$) input ports and 2 ($=2^1$) output ports. The structure of the 8×8 switch to which the optical switching device 1 is applied under the condition n=1 will be described later in FIG. 4.

If the optical switching device 1 is used as an 8×8 switch and n is a number which is higher than or equal to two, then m>n is not satisfied. Accordingly, with the 8×8 switch the value of n is limited to one (in a word, the 8×8 switch includes a 2-to-4 demultiplexing coupler and a 4-to-2 multiplexing coupler).

If the optical switching device 1 is used as a 256×256 switch, N=256 and k=8. If n=2 (m=k−n=8−2=6, so m>n is satisfied), then the optical demultiplexing section 10 includes 64 ($=2^{8-2}$) demultiplexing couplers 11 each having 4 ($=2^2$) input ports and 64 ($=2^{8-2}$) output ports.

In addition, the switch fabric section 20 includes 4,096 ($=2^{8-2} \times 2^{8-2}$) SOAs and the optical multiplexing section 30 includes 64 ($=2^{8-2}$) multiplexing coupler 31 each having 64 ($2^{8-2}$) input ports and 4 ($=2^2$) output ports.

As stated above, if the optical switching device 1 is used as the 256×256 switch under the condition n=2, 64 4-to-64 demultiplexing couplers 11 each having 4 input ports and 64 output ports and 64 64-to-4 multiplexing couplers 31 each having 64 input ports and 4 output ports are needed. However, if the 256×256 switch is actually formed, the following method is used. The 4-to-64 demultiplexing coupler 11 can be formed by combining a plurality of 2-to-8 demultiplexing couplers. The 64-to-4 multiplexing coupler 31 can be formed by combining a plurality of 8-to-2 multiplexing couplers. The structure of the 256×256 switch will be described later in FIGS. 8 and 9.

If the optical switching device 1 is used as the 256×256 switch and n=1, then m=k−n=8−1=7. As a result, m>n is satisfied. Accordingly, the 256×256 switch can theoretically be formed by using 128 2($=2^1$)-to-128($=2^7$) demultiplexing couplers and 128 128-to-2 multiplexing couplers. If n=3, then m=k−n=8−3=5. As a result, m>n is satisfied. Accordingly, the 256×256 switch can theoretically be formed by using 32 8(=$2^3$)-to-32(=$2^5$) demultiplexing couplers and 32 32-to-8 multiplexing couplers (n which is higher than or equal to four does not satisfy m>n, so n is one, two, or three).

However, if n=1, the number of SOAs is 128×128 and is large. (The number of SOAs needed in a switch fabric section of a conventional 256×256 switch is 256×256. The number 128×128 is smaller than this number.)

If n=3, the number of SOAs is 32×32 and is smaller. However, the number of input ports of one demultiplexing unit and the number of output ports of one multiplexing unit become large. As a result, a scheduling process (control of optical packet sending timing) described later becomes complex. Therefore, the use of 64 4-to-64 demultiplexing couplers 11 and 64 64-to-4 multiplexing couplers 31 in the case of n=2 is really proper. The following descriptions of a 256×256 switch are based on this structure.

Figure 3:
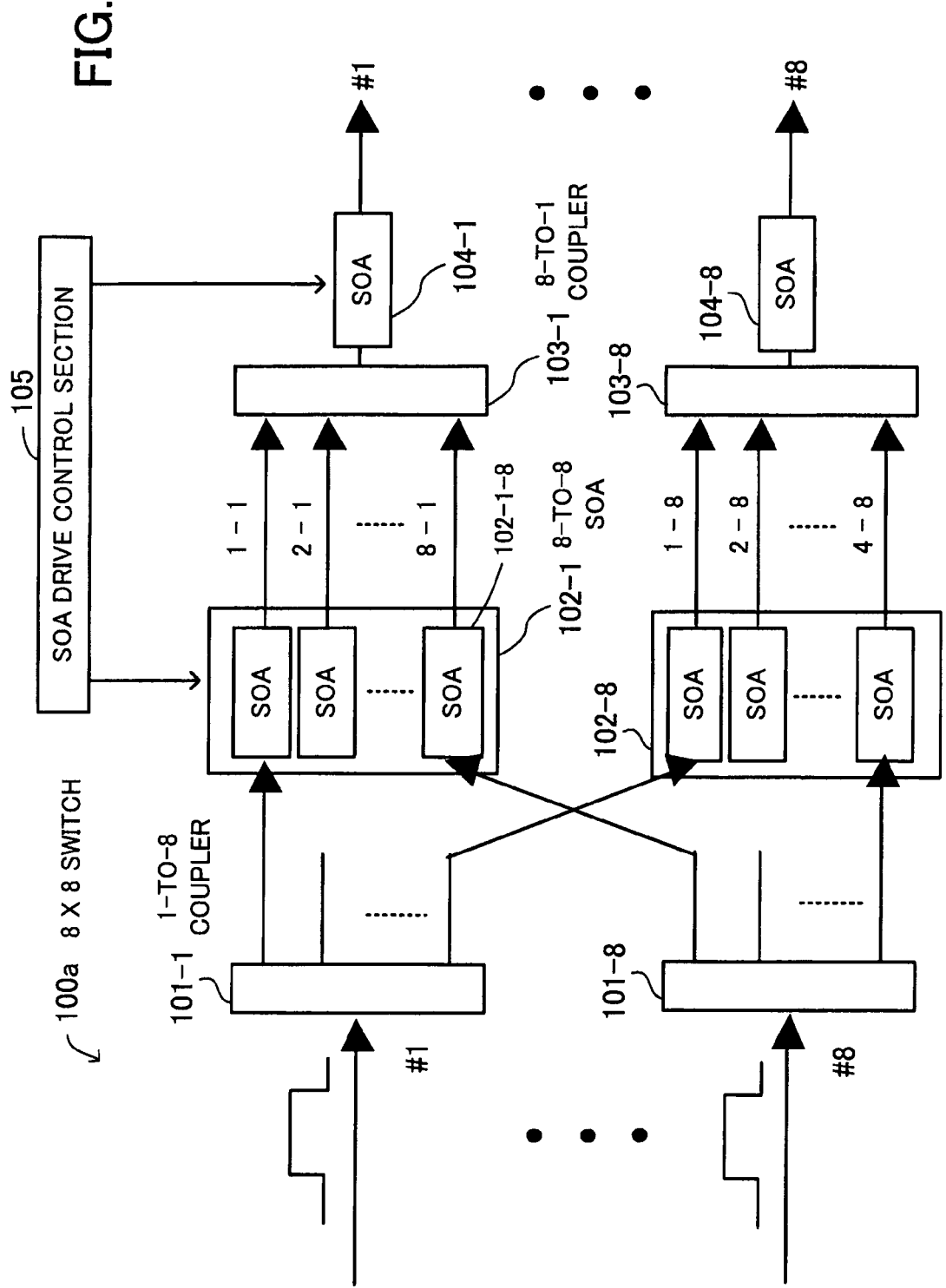
FIG. 3 is a view showing the structure of an 8×8 switch.
Figure 4:
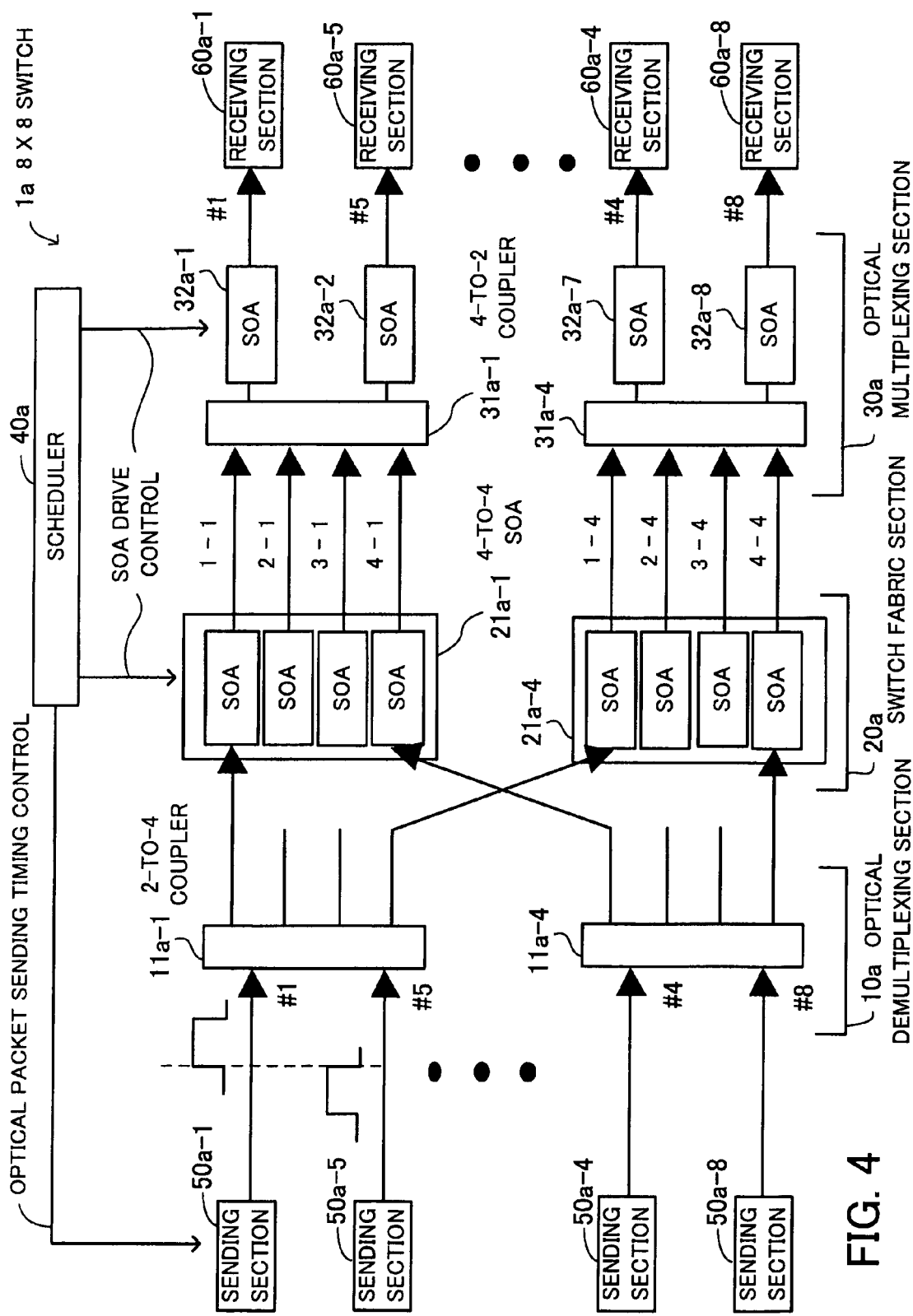
FIG. 4 is a view showing the structure of an 8×8 switch.

The optical switching device 1 used as an 8×8 switch will now be described in detail by comparison with a conventional 8×8 switch. Each of FIGS. 3 and 4 is a view showing the structure of an 8×8 switch. FIG. 3 is a view showing the structure of a conventional 8×8 switch. FIG. 4 is a view showing the structure of an 8×8 switch to which the optical switching device 1 is applied.

A conventional 8×8 switch 100a shown in FIG. 3 comprises 8 1-to-8 couplers 101-1 through 101-8, 8 8-to-8 SOAs 102-1 through 102-8, 8 8-to-1 couplers 103-1 through 103-8, SOAs 104-1 through 104-8, and an SOA drive control section 105. Each of the 8 8-to-8 SOAs 102-1 through 102-8 includes 8 SOAs and has 8 inputs and 8 outputs.

The symbol a-b (such as 1-1 or 2-1) is indicated behind each 8-to-8 SOA. "a" indicates an input stage number and "b" indicates an output stage number. That is to say, "a-b" indicates an input stage from which an optical packet flows and an output stage from which the optical packet is outputted.

With the 8×8 switch 100a, an optical packet inputted from each of input ports #1 through #8 is demultiplexed into eight packet components by a corresponding 1-to-8 coupler 101. 64 packet components are inputted to SOAs included in the 8-to-8 SOAs 102-1 through 102-8 at the next stage (total number of the SOAs included in the 8-to-8 SOAs 102-1 through 102-8 is 64).

64 outputs from the 8-to-8 SOAs 102-1 through 102-8 are multiplexed by eights by the 8-to-1 couplers 103-1 through 103-8, are amplified by the corresponding SOAs 104-1 through 104-8 for recovering losses which occur in the 8-to-1 couplers 103-1 through 103-8, and are outputted to output ports #1 through #8.

For example, to connect the input port #8 and the output port #1, the SOA drive control section 105 drives an eighth SOA 102-1-8 included in the 8-to-8 SOA 102-1 and the SOA 104-1 at the same time. By doing so, an optical packet inputted from the input port #8 is outputted only to the output port #1.

An 8×8 switch 1a to which the optical switching device 1 is applied is shown in FIG. 4. The 8×8 switch 1a comprises an optical demultiplexing section 10a, a switch fabric section 20a, an optical multiplexing section 30a, a scheduler 40a, sending sections 50a-1 through 50a-8, and receiving sections 60a-1 through 60a-8.

The optical demultiplexing section 10a includes 4 2-to-4 couplers 11a-1 through 11a-4. The switch fabric section 20a includes 4 4-to-4 SOAs 21a-1 through 21a-4. The optical multiplexing section 30a includes 4 4-to-2 couplers 31a-1 through 31a-4 and 8 SOAs 32a-1 through 32a-8 (which correspond to second optical amplification sections). EDFAs (which correspond to first optical amplification sections) may be located at input stages, output stages, or input and output stages of the 2-to-4 couplers 11a-1 through 11a-4 (not shown).

With the 8×8 switch 1a, an optical signal inputted from each of input ports #1 through #8 is demultiplexed into 4 signal components by a corresponding 2-to-4 coupler 11a. 16 signal components are inputted to SOAs included in the 4-to-4 SOAs 21a-1 through 21a-4 at the next stage (total number of the SOAs included in the 4-to-4 SOAs 21a-1 through 21a-4 is 16).

16 outputs from the 4-to-4 SOAs 21a-1 through 21a-4 are multiplexed by fours by the 4-to-2 couplers 31a-1 through 31a-4, are amplified by the corresponding SOAs 32a-1 through 32a-8 for recovering losses which occur in the 4-to-2 couplers 31a-1 through 31a-4, and are outputted to output ports #1 through #8.

Figure 5:
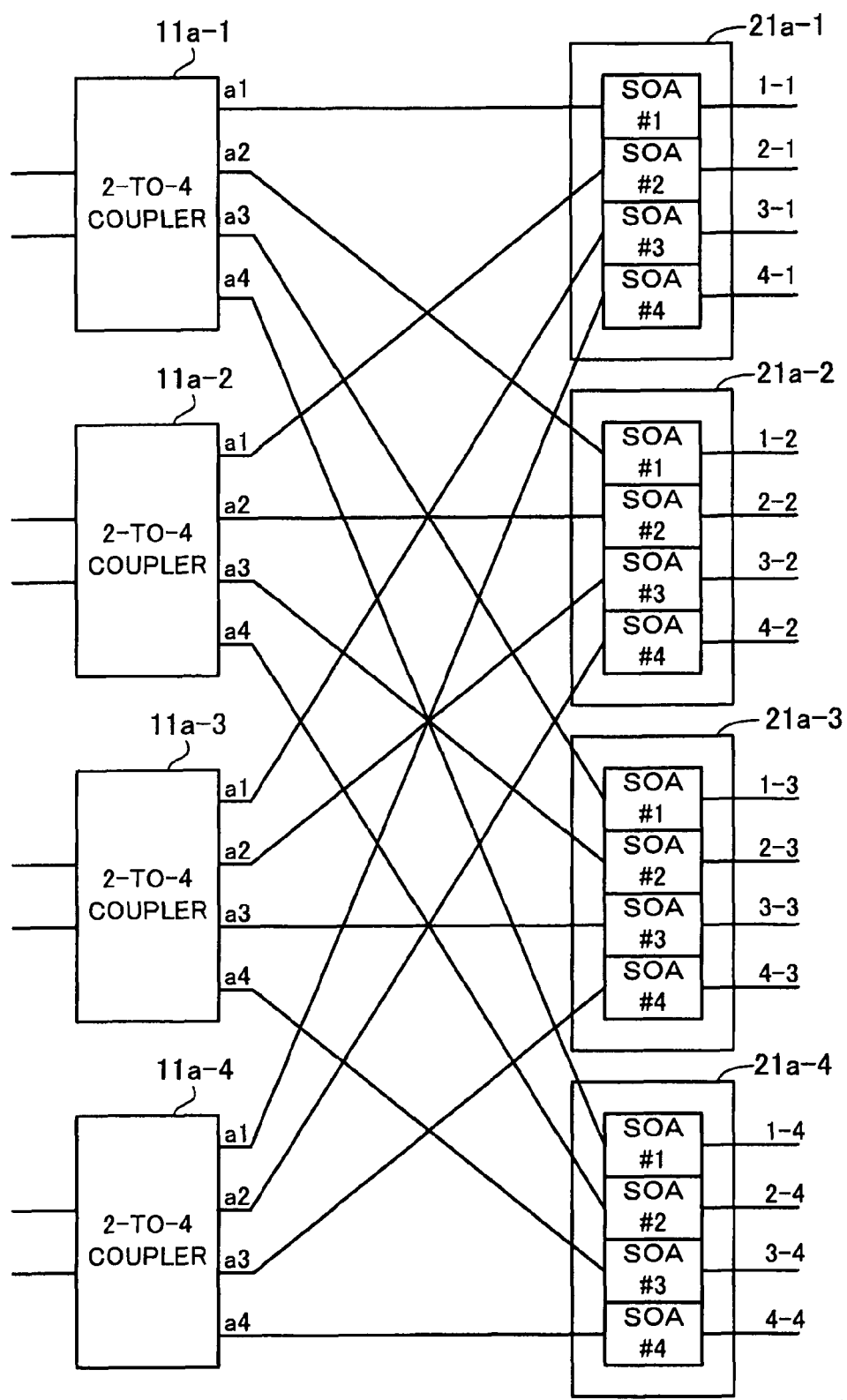
FIG. 5 is a view showing how 2-to-4 couplers and 4-to-4 SOAs are connected.

FIG. 5 is a view showing how the 2-to-4 couplers 11a-1 through 11a-4 and the 4-to-4 SOAs 21a-1 through 21a-4 are connected. An output terminal a1 of the 2-to-4 coupler 11a-1, an output terminal a1 of the 2-to-4 coupler 11a-2, an output terminal a1 of the 2-to-4 coupler 11a-3, and an output terminal a1 of the 2-to-4 coupler 11a-4, that is to say, a total of the 4 output terminals a1 are connected to SOAs #1 through #4, respectively, of the 4-to-4 SOA 21a-1.

An output terminal a2 of the 2-to-4 coupler 11a-1, an output terminal a2 of the 2-to-4 coupler 11a-2, an output terminal a2 of the 2-to-4 coupler 11a-3, and an output terminal a2 of the 2-to-4 coupler 11a-4, that is to say, a total of the 4 output terminals a2 are connected to SOAs #1 through #4, respectively, of the 4-to-4 SOA 21a-2. Similarly, an output terminal a-4 of the 2-to-4 coupler 11a-1, an output terminal a-4 of the 2-to-4 coupler 11a-2, an output terminal a-4 of the 2-to-4 coupler 11a-3, and an output terminal a-4 of the 2-to-4 coupler 11a-4, that is to say, a total of the 4 output terminals a4 are connected to SOAs #1 through #4, respectively, of the 4-to-4 SOA 21a-4.

With the conventional 8×8 switch 100a, the 8 1-to-8 couplers and the 8 8-to-1 couplers are used. With the 8×8 switch 1a, the 4 2-to-4 couplers and the 4 4-to-2 couplers are used. Two input ports share one 2-to-4 coupler and two output ports share one 4-to-2 coupler. Accordingly, the number of the couplers used is 4 and is reduced by half. As a result, the scale of a circuit can be reduced.

As can be seen from the internal structure of the coupler shown in FIG. 2, the change from the 1-to-8 couplers to the 2-to-4 couplers and the change from the 8-to-1 couplers to the 4-to-2 couplers decrease the number of signal components into which an optical signal is demultiplexed. This means that the number of times each signal component passes through internal coupler elements decreases. As a result, transmission loss is reduced (transmission loss improves by about 3 dB per stage).

With the 8×8 switch 100a, the number of the SOAs included in a section corresponding to the switch fabric section is 64 (=8×8) and the number of the SOAs located at the output stage is 8. Accordingly, the total number of the SOAs used is 72. With the 8×8 switch 1a, the number of the SOAs included in the switch fabric section 20a is 16 (4×4) and the number of the SOAs located at the output stage is 8. Accordingly, the total number of the SOAs used is 24. As a result, the number of the SOAs used in the 8×8 switch 1a is reduced to one third of the number of the SOAs used in the 8×8 switch 100a. Therefore, the scale of a circuit can be reduced. In addition, an SOA is a costly element, so a cost can be reduced.

With the 8×8 switch 1a, two input ports share one demultiplexing coupler and two output ports share one multiplexing coupler. As a result, ports which share the same coupler cannot be used at the same time.

For example, the input ports #1 and #5 cannot be used at the same time (optical packet cannot be inputted to the input ports #1 and #5 in the same time slot). The output ports #1 and #5 cannot be used at the same time (optical packet cannot be outputted to the output ports #1 and #5 in the same time slot).

Accordingly, in order to avoid an optical packet collision (optical packet overlap) in the same time slot at input and output time, control must be exercised. The scheduler 40a controls optical packet sending timing (details will be described later in FIGS. 13 and 14). The scheduler 40a also exercises drive control over an SOA on a route along which an optical packet passes at switching time. That is to say, the scheduler 40a exercises control over the turning on of an SOA on a route along which an optical packet passes at switching time.

The extension of the number of ports will now be described. It is assumed that a 4×4 switch is installed at first and that the 4×4 switch is then switched to an 8×8 switch. With a conventional switch, all of components each having 4 input ports and 4 output ports must be changed to components each having 8 input ports and 8 output ports. Accordingly, the device itself must be replaced.

As a result, formerly a large-scale switching device must be installed from the beginning in order to avoid switch extension work (72 costly SOA elements some of which are unnecessary for current operation must be installed in advance in the case of an 8×8 switch).

The number of the components used in the 8×8 switch 1a to which the optical switching device 1 is applied is smaller than the number of the components used in the conventional 8×8 switch 100a. Therefore, even if the 8×8 switch 1a is installed from the beginning, an installation cost can be reduced (number of the SOAs used in the 8×8 switch 1a is 24 and is one third of the number of the SOAs used in the conventional 8×8 switch 100a).

With the 8×8 switch 1a, the number of input ports and the number of output ports are increased later to 8. In this case, the input ports #5 through #8 and the output ports #5 through #8 are not used at first. To extend a 4×4 switch to an 8×8 switch, the input ports #5 through #8 and the output ports #5 through #8 should simply be used. Accordingly, it is possible to easily extend a switch without, for example, changing components. As a result, an optical network can be built flexibly and practicality and convenience can be improved.

A 256×256 switch to which the optical switching device 1 is applied will now be described in detail by comparison with a conventional 256×256 switch. Each of FIGS. 6 through 9 is a view showing the structure of a 256×256 switch.

Figure 6:
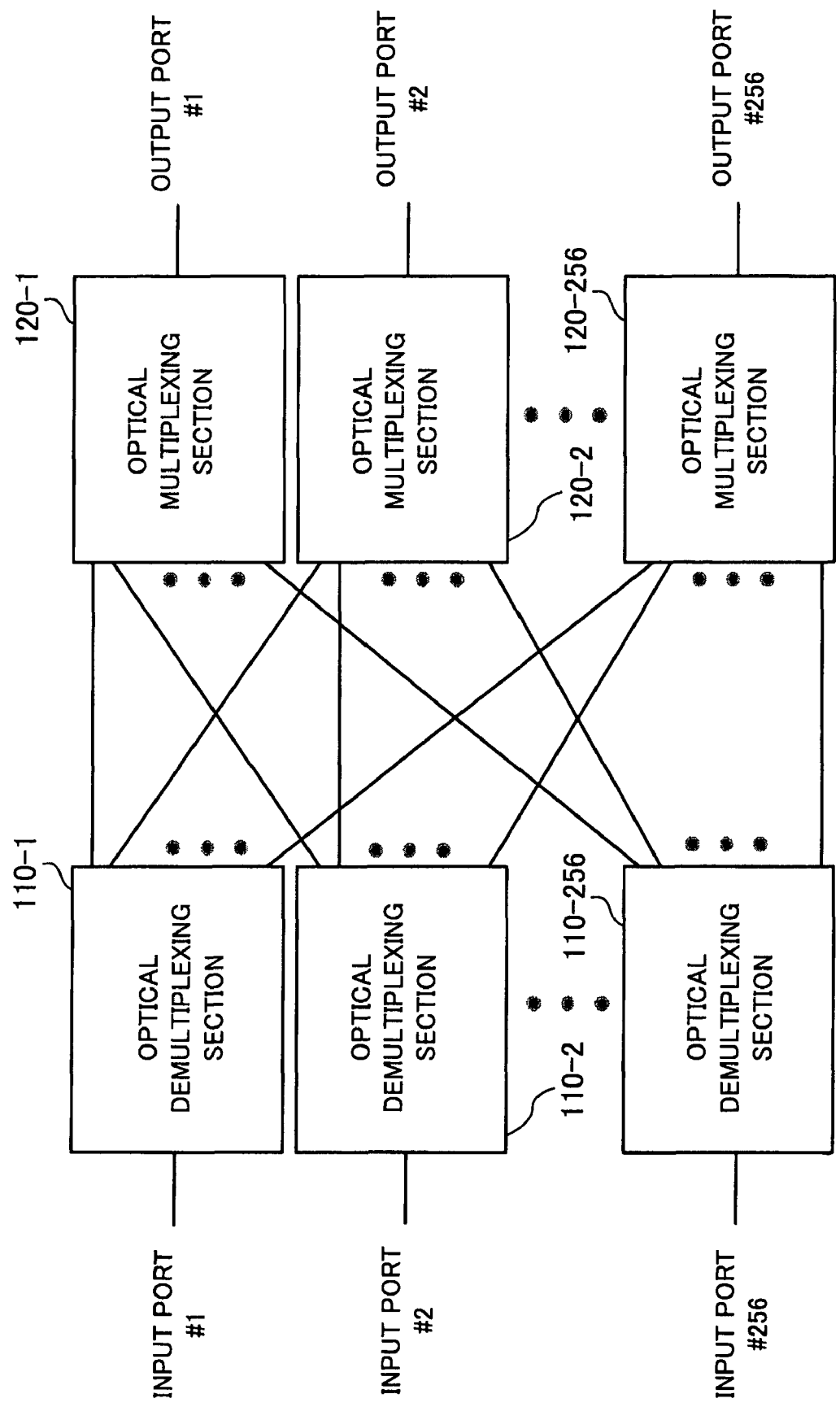
FIG. 6 is a view showing the structure of a 256×256 switch.
Figure 7:
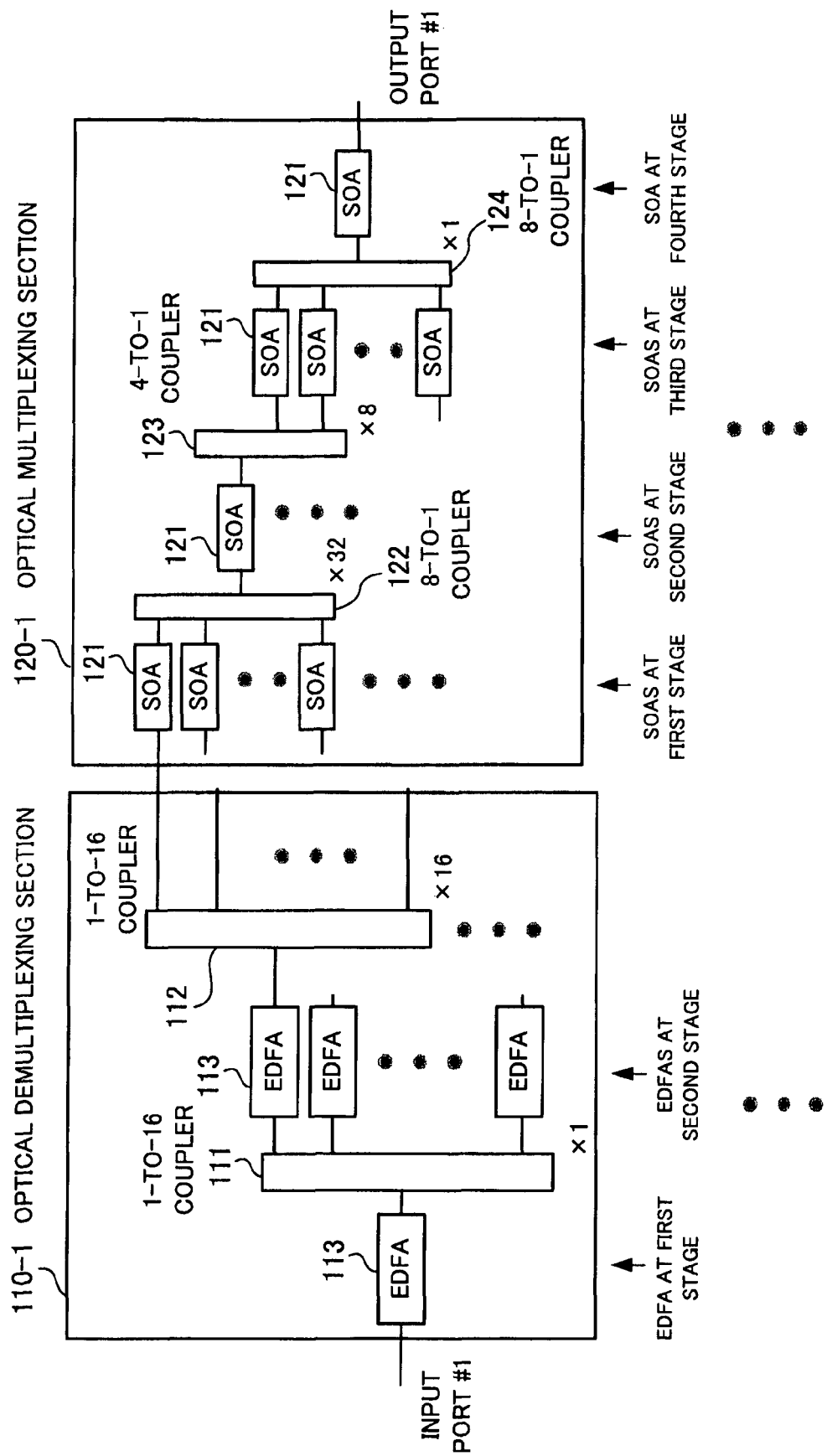
FIG. 7 is a view showing the structure of the 256×256 switch.
Figure 8:
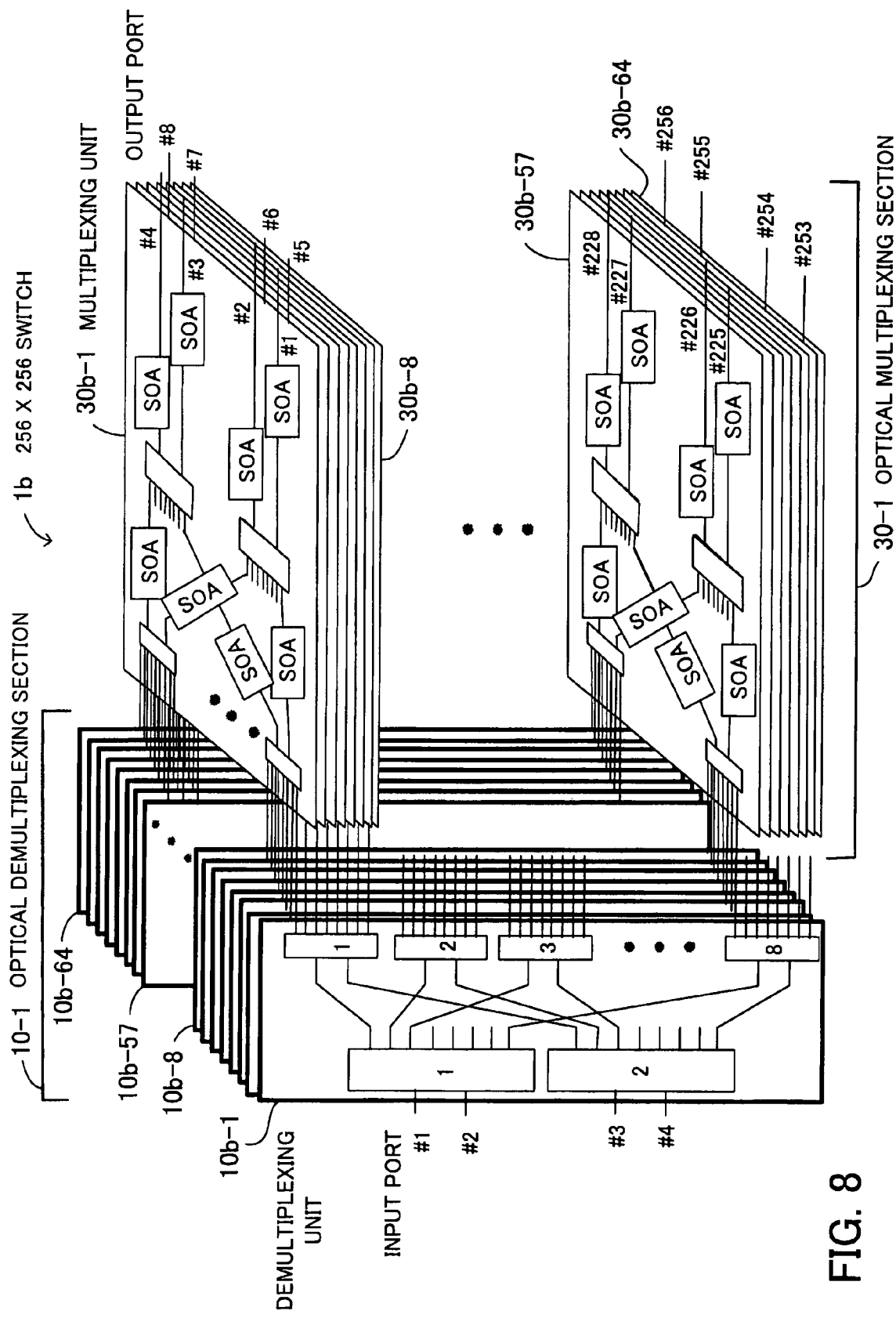
FIG. 8 is a view showing the structure of a 256×256 switch.
Figure 9:
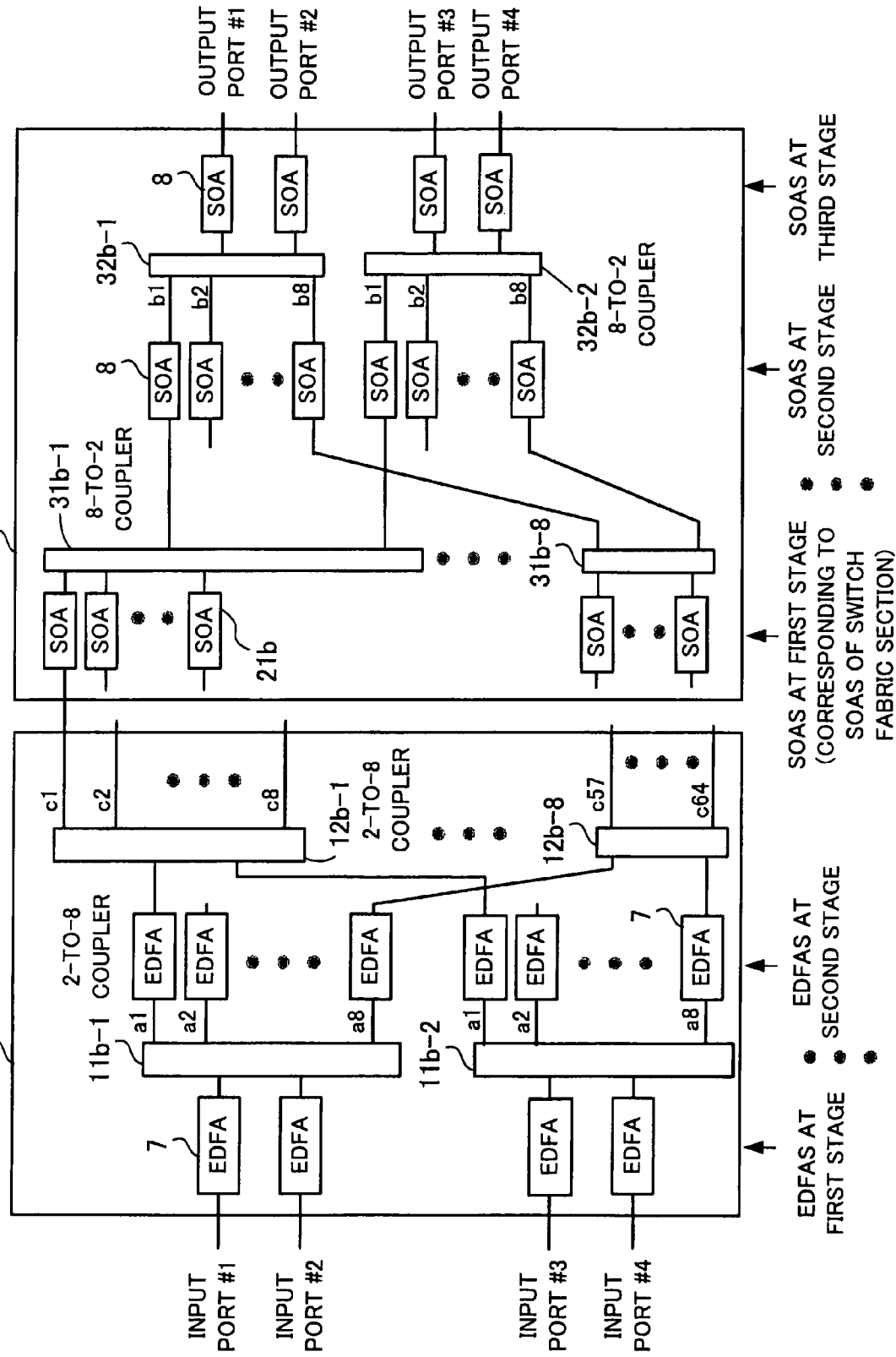
FIG. 9 is a view showing the structure of the 256×256 switch.

FIGS. 6 and 7 are views showing a conventional 256×256 switch. FIG. 6 is a block diagram showing the whole of a conventional 256×256 switch. FIG. 7 is a block diagram showing the internal structure of the conventional 256×256 switch. FIGS. 8 and 9 are views showing a 256×256 switch to which the optical switching device 1 is applied. FIG. 8 is a block diagram showing the whole of a 256×256 switch to which the optical switching device 1 is applied. FIG. 9 is a block diagram showing the internal structure of the 256×256 switch to which the optical switching device 1 is applied.

The conventional 256×256 switch will be described first. A conventional 256×256 switch 100b shown in FIG. 6 comprises 256 optical demultiplexing sections 110-1 through 110-256 corresponding to input ports #1 through #256 respectively and 256 optical multiplexing sections 120-1 through 120-256 corresponding to output ports #1 through #256 respectively (SOA drive control section is not shown).

Input light from one input port is demultiplexed into 256 light components at an output stage of a corresponding optical demultiplexing section. 256 demultiplexing lines from one optical demultiplexing section are connected to the optical multiplexing sections 120-1 through 120-256 respectively.

In FIG. 7, the optical demultiplexing section 110-1 includes one 1-to-16 coupler 111, 16 1-to-16 couplers 112, and 17 EDFAs 113. One EDFA and 16 EDFAs are located at first and second stages, respectively, and a total of 17 EDFAs are located.

The optical multiplexing section 120-1 includes 297 SOAs 121, 32 8-to-1 couplers 122, 8 4-to-1 couplers 123, and one 8-to-1 coupler 124. 256 SOAs, 32 SOAs, 8 SOAs, and one SOA are located at first, second, third, and fourth stages, respectively, and a total of 297 SOAs are located.

In the optical demultiplexing section 110-1, input light from one input port is amplified by the EDFA 113 at the first stage and the amplified input light is demultiplexed by the 1-to-16 coupler 111. Each light component which becomes weak after demultiplexing is amplified by an EDFA 113 at the second stage, is demultiplexed into 16 light subcomponents by a 1-to-16 coupler 112, and is outputted.

In the optical multiplexing section 120-1, the outputs from the optical demultiplexing section 110-1 are amplified by the SOAs 121 at the first stage, are multiplexed by eights by the 8-to-1 couplers 122, are amplified by the SOAs 121 at the second stage, are multiplexed by the 4-to-1 couplers 123, are amplified by the SOAs 121 at the third stage, are multiplexed by the 8-to-1 coupler 124, are amplified by the SOA 121 at the fourth stage, and are outputted.

A 256×256 switch to which the optical switching device 1 is applied will be described next. A 256×256 switch 1b shown in FIG. 8 comprises an optical demultiplexing section 10-1 and an optical multiplexing section 30-1 (a scheduler and a switch fabric section are not shown).

The optical demultiplexing section 10-1 includes 64 demultiplexing units 10b-1 through 10b-64 and the optical multiplexing section 30-1 includes 64 multiplexing units 30b-1 through 30b-64. One demultiplexing unit has 4 input ports and 64 output ports. One multiplexing unit has 64 input ports and 4 output ports.

Input light from one input port is demultiplexed into 64 light components at an output stage of a corresponding demultiplexing unit. 64 demultiplexing lines from one demultiplexing unit are connected to the multiplexing units 30b-1 through 30b-64 respectively.

In FIG. 9, the demultiplexing unit 10b-1 includes 2 2-to-8 couplers 11b-1 and 11b-2 (corresponding to first demultiplexing couplers), 8 2-to-8 couplers 12b-1 through 12b-8 (corresponding to second demultiplexing couplers), and 20 EDFAs 7 (corresponding to a first optical amplification section). Each EDFA 7 corresponds to an input optical packet and the response speed of gain control is high. 4 EDFAs 7 and 16 EDFAs 7 are located at first and second stages, respectively, and a total of 20 EDFAs 7 are located.

16 output ports of the 2-to-8 couplers 11b-1 and 11b-2 are connected to 16 input ports, respectively, of the 2-to-8 couplers 12b-1 through 12b-8 via the EDFAs 7 at the second stage.

By connecting the 2-to-8 couplers 11b-1 and 11b-2 and the 2-to-8 couplers 12b-1 through 12b-8 in this way, the same demultiplexing function that a 4-to-64 demultiplexing coupler with 4 input ports and 64 output ports has can be realized by the demultiplexing unit 10b-1 (the same applies to the demultiplexing units 10b-2 through 10b-64).

The multiplexing unit 30b-1 includes 8 8-to-2 couplers 31b-1 through 31b-8 (corresponding to third multiplexing couplers), 2 8-to-2 couplers 32b-1 and 32b-2 (corresponding to fourth multiplexing couplers), 64 SOAs 21b (corresponding to SOAs of a switch fabric section), and 20 SOAs 8 (corresponding to a second optical amplification section). 64 SOAs, 16 SOAs, and 4 SOAs are located at first, second, and third stages, respectively, and a total of 84 SOAs are located. The SOAs 21b at the first stage of the multiplexing unit 30b-1 correspond to SOAs of a switch fabric section. In this example, however, the SOAs 21b are included in the multiplexing unit 30b-1.

16 output ports of the 8-to-2 couplers 31b-1 through 31b-8 are connected to 16 input ports, respectively, of the 8-to-2 couplers 32b-1 and 32b-2 via the SOAs 8 at the second stage.

By connecting the 8-to-2 couplers 31b-1 through 31b-8 and the 8-to-2 couplers 32b-1 and 32b-2 in this way, the same multiplexing function that a 64-to-4 multiplexing coupler with 64 input ports and 4 output ports has can be realized by the multiplexing unit 30b-1 (the same applies to the multiplexing units 30b-2 through 30b-64).

In the demultiplexing unit 10b-1, input optical signals from input ports #1 through #4 are amplified by the EDFAs 7 at the first stage. The 2-to-8 coupler 11b-1 demultiplexes the input optical signals from the input ports #1 and #2 into 8 optical signal components and the 2-to-8 coupler 11b-2 demultiplexes the input optical signals from the input ports #3 and #4 into 8 optical signal components.

The optical signal components which become weak after demultiplexing are amplified by the EDFAs 7 at the second stage and 16 outputs are obtained. The 16 outputs are inputted to the 2-to-8 couplers 12b-1 through 12b-8 by twos. As a result, 64 outputs are obtained at an output stage of the 2-to-8 couplers 12b-1 through 12b-8.

How to connect the 2-to-8 couplers 11b-1 and 11b-2 and the 2-to-8 couplers 12b-1 through 12b-8 is as follows. Of 8 outputs from the 2-to-8 coupler 11b-1, an output a1 is connected to one of two inputs of the 2-to-8 coupler 12b-1 via the EDFA 7 and an output a2 is connected to one of two inputs of the 2-to-8 coupler 12b-2 via the EDFA 7.

The other connections are made in the same way. Of the 8 outputs from the 2-to-8 coupler 11b-1, an output a7 is connected to one input of the 2-to-8 coupler 12b-7 via the EDFA 7 and an output a8 is connected to one input of the 2-to-8 coupler 12b-8 via the EDFA 7.

Of 8 outputs from the 2-to-8 coupler 11b-2, an output a1 is connected to the other input of the 2-to-8 coupler 12b-1 via the EDFA 7 and an output a2 is connected to the other input of the 2-to-8 coupler 12b-2 via the EDFA 7.

The other connections are made in the same way. Of the 8 outputs from the 2-to-8 coupler 11b-2, an output a7 is connected to the other input of the 2-to-8 coupler 12b-7 via the EDFA 7 and an output a8 is connected to the other input of the 2-to-8 coupler 12b-8 via the EDFA 7.

The multiplexing unit 30b-1 includes 64 SOAs 21b at the first stage, so outputs from the SOAs 21b are multiplexed by eights by the 8-to-2 couplers 31b-1 through 31b-8. Outputs from the 8-to-2 couplers 31b-1 through 31b-8 are connected to inputs of the 8-to-2 couplers 32b-1 and 32b-2 via the SOAs 8 at the second stage.

How to connect the 8-to-2 couplers 31b-1 through 31b-8 and the 8-to-2 couplers 32b-1 and 32b-2 is as follows. Of 2 outputs from the 8-to-2 coupler 31b-1, one is connected to an input b1 of the 8-to-2 coupler 32b-1 via the SOA 8 and the other is connected to an input b1 of the 8-to-2 coupler 32b-2 via the SOA 8.

Of 2 outputs from the 8-to-2 coupler 31b-2, one is connected to an input b2 of the 8-to-2 coupler 32b-1 via the SOA 8 and the other is connected to an input b2 of the 8-to-2 coupler 32b-2 via the SOA 8. The other connections are made in the same way. Of 2 outputs from the 8-to-2 coupler 31b-8, one is connected to an input b8 of the 8-to-2 coupler 32b-1 via the SOA 8 and the other is connected to an input b8 of the 8-to-2 coupler 32b-2 via the SOA 8.

The 8-to-2 coupler 32b-1 multiplexes 8 inputs into 2 optical packets. The 2 optical packets are amplified by the SOAs 8, respectively, at the third stage and are outputted from output ports #1 and #2 respectively. The 8-to-2 coupler 32b-2 multiplexes 8 inputs into 2 optical packets. The 2 optical packets are amplified by the SOAs 8, respectively, at the third stage and are outputted from output ports #3 and #4 respectively.

Figure 10:
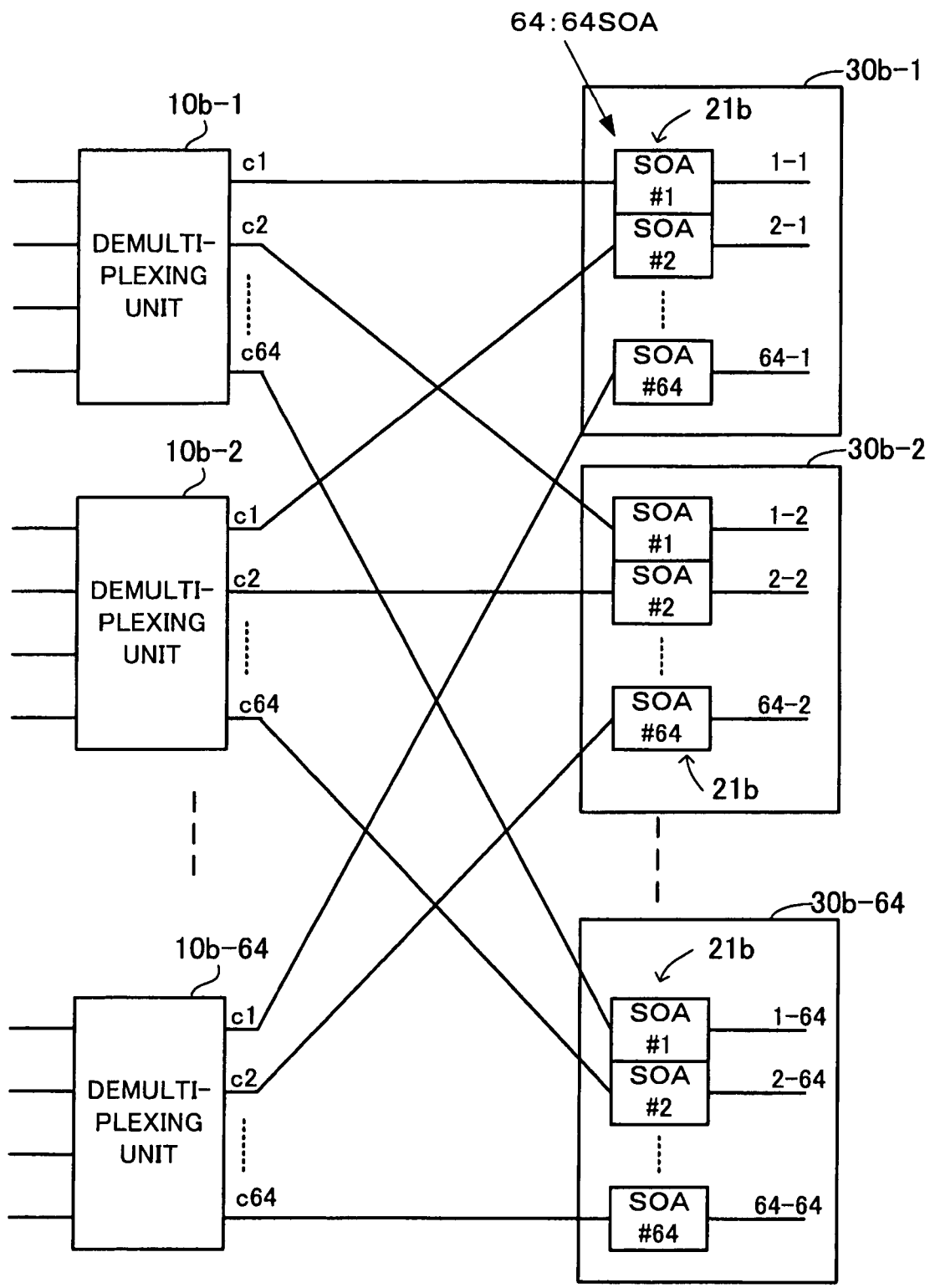
FIG. 10 is a view showing how demultiplexing units and multiplexing units are connected.

FIG. 10 is a view showing how the demultiplexing units 10b-1 through 10b-64 and the multiplexing units 30b-1 through 30b-64 are connected.

Output terminals c1 of the demultiplexing units 10b-1 through 10b-64, that is to say, a total of 64 output terminals c1 are connected to SOAs #1 through #64, respectively, which are the SOAs 21b at the first stage of the multiplexing unit 30b-1.

Output terminals c2 of the demultiplexing units 10b-1 through 10b-64, that is to say, a total of 64 output terminals c2 are connected to SOAs #1 through #64, respectively, which are the SOAs 21b included in the multiplexing unit 30b-2. The other connections are made in the same way. Output terminals c64 of the demultiplexing units 10b-1 through 10b-64, that is to say, a total of 64 output terminals c64 are connected to SOAs #1 through #64, respectively, which are the SOAs 21b included in the multiplexing unit 30b-64.

A generalized case of how an optical demultiplexing section 10 and a switch fabric section 20 are connected will now be described. $2^{k-n}$ demultiplexing couplers included in the optical demultiplexing section 10 are marked with $A_1$ through $A_p$ ($p=2^{k-n}$) Output terminals of one demultiplexing coupler are marked with c1 through $c_p$. Every p SOAs included in the switch fabric section 20 form a fabric unit and fabric units formed in this way are marked with $B_1$ through $B_p$.

In this case, the demultiplexing couplers $A_1$ through $A_p$ and the fabric units $B_1$ through $B_p$ are connected so that $2^{k-n}$ output terminals $c_h$ ($1 \leq h \leq p$) of the demultiplexing couplers $A_1$ through $A_p$ will be connected to SOAs, respectively, of the fabric unit $B_h$.

With a 256×256 switch, for example, p=64. Accordingly, the demultiplexing couplers $A_1$ through $A_{64}$ correspond to the demultiplexing units 10b-1 through 10b-64, respectively, shown in FIG. 10, and the output terminals $c_1$ through $c_{64}$ correspond to the c1 through c64, respectively, shown in FIG. 10. The fabric units $B_1$ through $B_{64}$ correspond to 64-to-64 SOAs, respectively, which are made up of the SOAs #1 through #64 included in the multiplexing units 30b-1 through 30b-64 shown in FIG. 10.

The demultiplexing couplers $A_1$ through $A_{64}$ and the fabric units $B_1$ through $B_{64}$ are connected so that $2^6$ output terminals $c_h$ ($1 \leq h \leq 64$) of the demultiplexing couplers $A_1$ through $A_{64}$ will be connected to the fabric unit $B_h$. For example, if h=2, in FIG. 10 the 64 output terminals c2 of the demultiplexing units 10b-1 through 10b-64 are connected to the SOAs #1 through #64, respectively, of the 64-to-64 SOA included in the multiplexing unit 30b-2.

The number of components used in the 256×256 switch 1b will now be described by comparison with a conventional 256×256 switch. FIG. 11 is a view showing the necessary number of each component included in the 256×256 switches. The number of each component used in the conventional 256×256 switch 100*b* (shown in the upper row of a table) will be described first.

The number of devices included in the optical demultiplexing sections 110-1 through 110-256 (which may generically be referred to as an optical demultiplexing section 110) is as follows. One optical demultiplexing section 110 includes one 1-to-16 coupler 111, so a total of 256 1-to-16 couplers 111 are included. 256 EDFAs 113 are located at the first stage and 16×256 EDFAs 113 are located at the second stage. Accordingly, a total of (256+16×256) EDFAs 113 are included. One optical demultiplexing section 110 includes 16 1-to-16 couplers 112, so a total of (16×256) 1-to-16 couplers 112 are included.

The number of devices included in the optical multiplexing sections 120-1 through 120-256 (which may generically be referred to as an optical multiplexing section 120) is as follows. One optical multiplexing section 120 includes 256 SOAs 121 at the first stage, so a total of (256×256) SOAs 121 are included. 8-to-1 couplers 122 multiplex 256 inputs by eights, so one optical multiplexing section 120 includes 32 8-to-1 couplers 122. As a result, a total of (32×256) 8-to-1 couplers 122 are included. An SOA 121 is located at the second stage for one output of an 8-to-1 coupler 122, so one optical multiplexing section 120 includes 32 SOAs 121 at the second stage. As a result, a total of (32×256) SOAs 121 are located at the second stage.

4-to-1 couplers 123 multiplex 32 outputs from the 32 SOAs 121 by fours, so one optical multiplexing section 120 includes 8 4-to-1 couplers 123. As a result, a total of (8×256) 4-to-1 couplers 123 are included. SOAs 121 located at the third stage correspond to outputs from the 8 4-to-1 couplers 123, so one optical multiplexing section 120 includes 8 SOAs 121 at the third stage. As a result, a total of (8×256) SOAs 121 are included. The 8-to-1 coupler 124 multiplexes outputs from the 8 SOAs 121 at the third stage into one optical packet, so one optical multiplexing section 120 includes one 8-to-1 coupler 124. As a result, a total of 256 8-to-1 couplers 124 are included. An SOA 121 located at the fourth stage (final stage) correspond to an output from the 8-to-1 coupler 124, so one optical multiplexing section 120 includes one SOA 121 at the fourth stage. As a result, a total of 256 SOAs 121 are included.

The number of each component used in the 256×256 switch 1*b* (shown in the lower row of the table) will be described next. The number of devices included in the demultiplexing units 10*b*-1 through 10*b*-64 (which may generically be referred to as a demultiplexing unit 10*b*) is as follows. One demultiplexing unit 10*b* includes the 2-to-8 couplers 11*b*-1 and 11*b*-2 at the first stage, so a total of (2×64) 2-to-8 couplers are included. One demultiplexing unit 10*b* includes 4 EDFAs 7 at the first stage, so a total of (4×64) EDFAs 7 are included. EDFAs 7 located at the second stage correspond to outputs from the 2-to-8 couplers 11*b*-1 and 11*b*-2, so one demultiplexing unit 10*b* includes 16 EDFAs 7. As a result, a total of (16×64) EDFAs 7 are included. Accordingly, the total number of EDFAs 7 included in the demultiplexing units 10*b*-1 through 10*b*-64 is (4×64+16×64). One demultiplexing unit 10*b* includes the 2-to-8 couplers 12*b*-1 through 11*b*-8 at the second stage. That is to say, one demultiplexing unit 10*b* includes 8 2-to-8 couplers at the second stage, so a total of (8×64) 2-to-8 couplers are included.

The number of devices included in the multiplexing units 30*b*-1 through 30*b*-64 (which may generically be referred to as a multiplexing unit 30*b*) is as follows. One multiplexing unit 30*b* includes 64 SOAs 21*b* at the first stage, so a total of (64×64) SOAs 21*b* are included. 8-to-2 couplers 31*b*-1 through 31*b*-8 multiplex 64 inputs by eights, so one multiplexing unit 30*b* includes 8 8-to-2 couplers. As a result, a total of (8×64) 8-to-2 couplers are included.

SOAs 8 located at the second stage correspond to outputs from the 8-to-2 couplers 31*b*-1 through 31*b*-8, so one multiplexing unit 30*b* includes 16 SOAs 8. As a result, a total of (16×64) SOAs 8 are included. The 8-to-2 couplers 32*b*-1 and 32*b*-2 multiplex outputs from the 8 SOAs 8 at the third stage into four optical packets, so one multiplexing unit 30*b* includes 2 8-to-2 couplers 32*b*. As a result, a total of (2×64) 8-to-2 couplers 32*b* are included. One multiplexing unit 30*b* includes 4 SOAs 8 at the third stage (final stage), so a total of (4×64) SOAs 8 are included.

FIG. 12 is a view showing the total number of devices required for each function in the 256×256 switches. The number of the SOAs used in the 256×256 switch 100*b* is 76,032. The number of the SOAs used in the 256×256 switch 1*b* is 5,120. Accordingly, the number of the SOAs used in the 256×256 switch 1*b* is reduced to about one fifteenth of the number of the SOAs used in the 256×256 switch 100*b*. The number of the EDFAs used in the 256×256 switch 100*b* is 4,352. The number of the EDFAs used in the 256×256 switch 1*b* is 1,280. Accordingly, the number of the EDFAs used in the 256×256 switch 1*b* is reduced to about one third of the number of the EDFAs used in the 256×256 switch 100*b*. The number of the couplers used in the 256×256 switch 100*b* is 14,848. The number of the couplers used in the 256×256 switch 1*b* is 1,280. Accordingly, the number of the EDFAs used in the 256×256 switch 1*b* is reduced to about one twelfth of the number of the EDFAs used in the 256×256 switch 100*b*.

As stated above, the number of the input ports of the 256×256 switch 1*b* is the same as that of the input ports of the conventional 256×256 switch 100*b* and the number of the output ports of the 256×256 switch 1*b* is the same as that of the output ports of the conventional 256×256 switch 100*b*. Compared with the conventional 256×256 switch 100*b*, however, the number of SOAs used, the number of demultiplexing couplers used, the number of multiplexing couplers used, and the number of EDFAs used can significantly be reduced.

Figure 13:
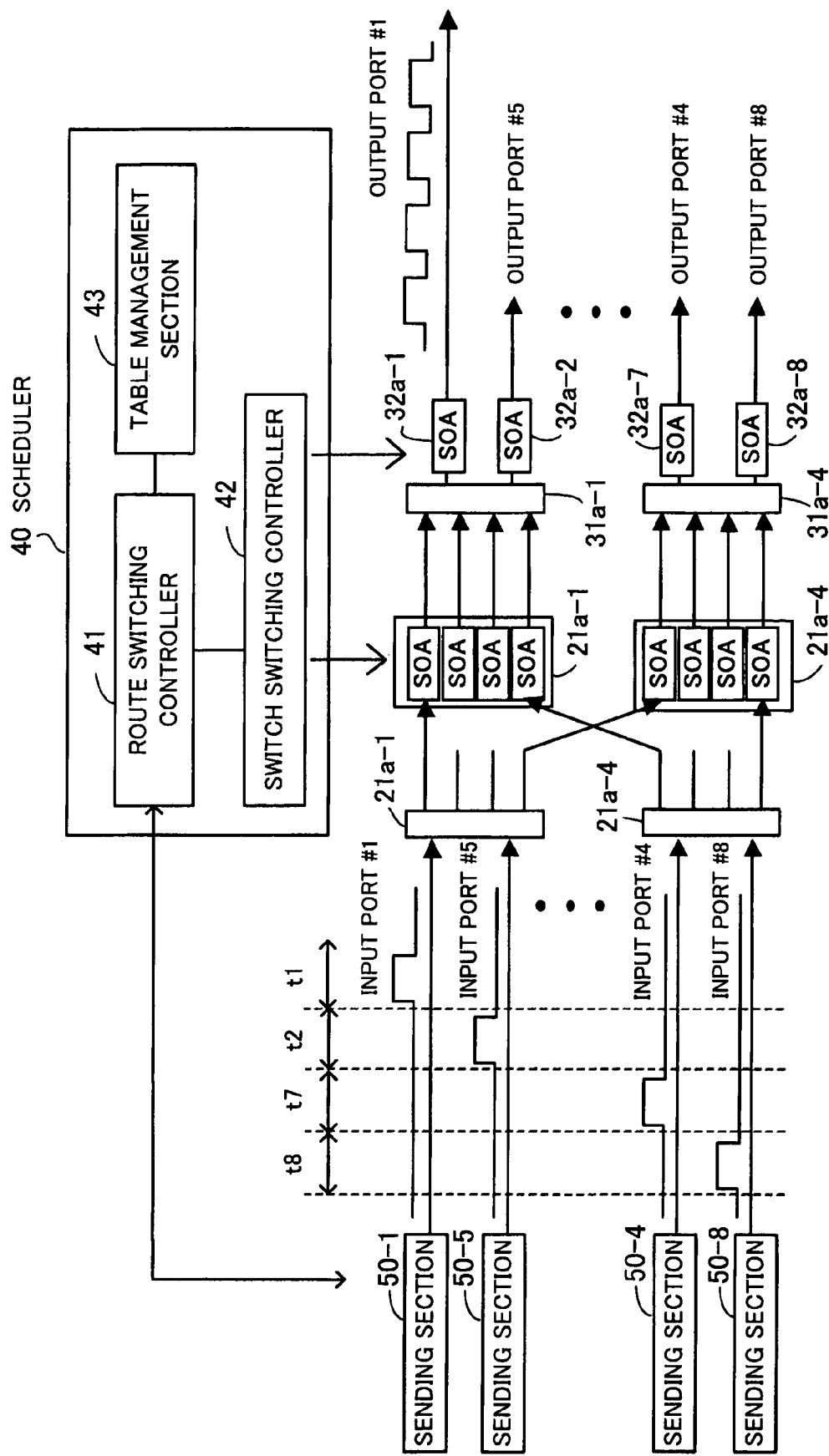
FIG. 13 is a schematic view showing a scheduling process.

A scheduling process performed by the optical switching device 1 will now be described. FIG. 13 is a schematic view showing a scheduling process. In this example, a scheduling process which is performed in the case of a plurality of input optical packets being switched to the same output port is shown.

The scheduler 40 includes a route switching controller 41, a switch switching controller 42, and a table management section 43. The route switching controller 41 controls the timing at which a sending section 50 sends an optical packet. The switch switching controller 42 exercises control over the turning on/off of an SOA. The table management section 43 manages table information necessary for route switching and the like (described later in FIGS. 15 through 17).

It is assumed that an 8×8 switch is used. If a plurality of input optical packets are switched to the same output port in the same time slot, then an optical packet collision occurs at the output port.

It is necessary to avoid such a switching state. Accordingly, the route switching controller 41 controls the timing at which sending sections 50-1 through 50-8 send optical packets so that the optical packets will not overlap at the same output port. At the same time that the route switching controller 41 controls sending timing, the switch switching controller 42 controls the timing at which the on/off state of an SOA is switched. By exercising such control, the plurality of optical packets are outputted in order from the same output port.

For example, it is assumed that all of optical packets inputted to input ports #1 through #8 are switched to an output port

1. First, each of the sending sections 50-1 through 50-8 informs the route switching controller 41 of a send request including a request to output an optical packet to the output port #1. The route switching controller 41 recognizes the contents of switching from the send request and controls sending timing so as to avoid an optical packet overlap.

For example, the route switching controller 41 exercises control so that the sending section 50-1 will send an optical packet in a time slot t1 and so that the sending section 50-2 will send an optical packet in a time slot t2. Similarly, the route switching controller 41 sets a time slot that minimizes delay time, and exercises control so that the sending section 50-8 will send an optical packet in a time slot t8. The switch switching controller 42 exercises control over the turning on/off of an SOA on a switch route along which an optical packet flows and connects an input port and an output port as desired.

Figure 14:
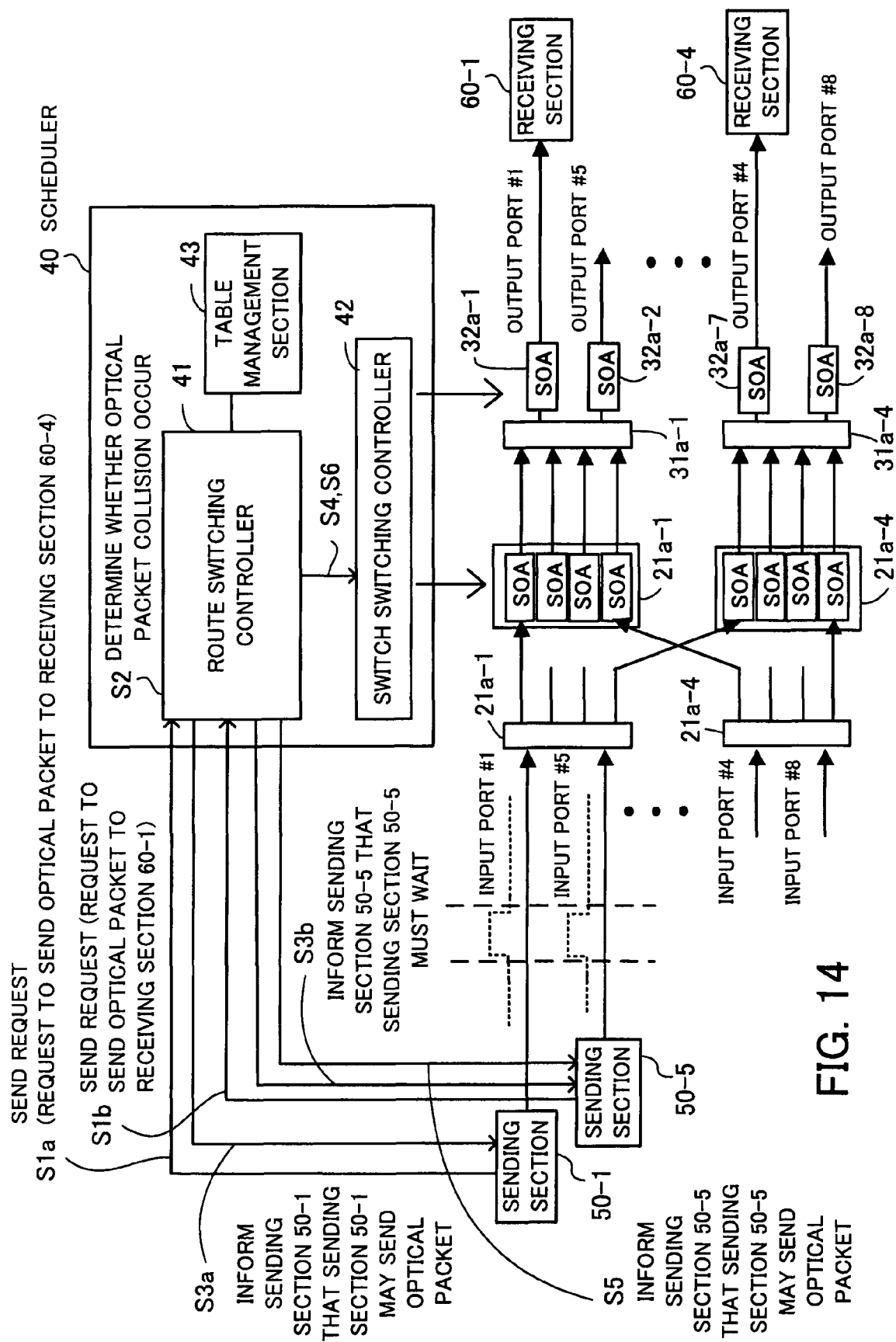
FIG. 14 is a schematic view showing a scheduling process.

FIG. 14 is a schematic view showing a scheduling process. In this example, a scheduling process which is performed in the case where a plurality of sending sections that share the same demultiplexing coupler make requests to send an optical packet in a same time slot is shown.

When the scheduler 40 recognizes a state in which a plurality of sending sections that share a same demultiplexing coupler send optical packets in a same time slot or a state in which optical packets are sent to a plurality of receiving sections that share a same multiplexing coupler in a same time slot from the contents of send requests made by the sending sections, the scheduler 40 controls the timing at which the sending sections send optical packets so that the optical packets sent from the sending sections will not overlap.

It is assumed that an 8×8 switch is used, that switching is performed from a sending section 50-1 connected to an input port #1 to an output port #4 to which a receiving section 60-4 is connected, and that switching is performed from a sending section 50-5 connected to an input port #5 to an output port #1 to which a receiving section 60-1 is connected.

[S1a] The sending section 50-1 informs the scheduler 40 of a send request including a request to send an optical packet to the receiving section 60-4.

[S1b] A short time after step S1a, the sending section 50-5 informs the scheduler 40 of a send request including a request to send an optical packet to the receiving section 60-1.

[S2] The route switching controller 41 included in the scheduler 40 determines on the basis of table information registered with the table management section 43 whether when the sending sections 50-1 and 50-5 send the optical packets at the same time, an optical packet collision occurs. In this case, the route switching controller 41 can recognize from the table information that the sending sections 50-1 and 50-5 share one demultiplexing coupler 21a-1. Accordingly, the route switching controller 41 determines that the sending sections 50-1 and 50-5 cannot send the optical packets at the same time.

[S3a] The route switching controller 41 informs the sending section 50-1 that the sending section 50-1 may send the optical packet.

[S3b] The route switching controller 41 informs the sending section 50-5 that the sending section 50-5 must wait.

[S4] The route switching controller 41 requests the switch switching controller 42 to connect the input port #1 and the output port #4. That is to say, the route switching controller 41 requests the switch switching controller 42 to turn on SOAs on a route which connects the input port #1 and the output port #4.

[S5] The sending section 50-1 sends the optical packet. After the optical packet passes through the switch (route switching controller 41 recognizes in advance time taken for the optical packet to pass through the switch), the route switching controller 41 informs the sending section 50-5 that the sending section 50-5 may send the optical packet.

[S6] The route switching controller 41 requests the switch switching controller 42 to connect the input port #5 and the output port #1.

Exercising control in this way prevents the optical packets sent from the sending sections 50-1 and 50-5 that share the same demultiplexing coupler 21a-1 from colliding in the demultiplexing coupler 21a-1.

As stated above, if there is any possibility of an optical packet collision, control is exercised to make one sending section that issues a send request after the other sending section issues a send request wait for one time slot. By doing so, switch control latency can be minimized.

In the above example, sending timing control is exercised if the scheduler 40 recognizes a state in which the plurality of sending sections that share the same demultiplexing coupler send optical packets in the same time slot on the basis of the contents of send requests issued from sending sections. However, the scheduler 40 also determines whether optical packets are sent to a plurality of receiving sections that share a same multiplexing coupler in a same time slot. In this case, the scheduler 40 exercises control in the same way over the timing at which sending sections send optical packets so that the optical packets sent from the sending sections will not overlap on the output side. The scheduler 40 controls sending timing in this way to avoid the possibility of an optical packet collision on the input and output sides.

The table management section 43 will now be described. The table management section 43 included in the scheduler 40 has a connection management table, an input-side collision management table, and an output-side collision management table. How a sending section and an input port of a demultiplexing coupler are connected, how a receiving section and an output port of a multiplexing coupler are connected, and the present state of the use of a switch route are dynamically registered in the connection management table.

An input-side collision group formed by considering input ports of a same demultiplexing coupler as one collision group and a priority assigned to each input port included in the input-side collision group are registered in the input-side collision management table.

An output-side collision group formed by considering output ports of a same multiplexing coupler as one collision group and a priority assigned to each output port included in the output-side collision group are registered in the output-side collision management table.

FIG. 15 is a view showing an example of the connection management table. In this example, a table corresponding to a 256×256 switch is shown. A connection management table T1 includes Sending Section Address (numbers or letters may be used), Demultiplexing Unit Number, Input Port Number, Signal Wavelength (ITU Grid Number), Receiving Section Address (numbers or letters may be used), Multiplexing Unit Number, Output Port Number, Use State, and Alarm items.

The first row of this table indicates that a sending section to which the address "0x804050" is assigned is connected to an input port #1 of a demultiplexing unit to which the number "S0001" is assigned, that the wavelength of an optical packet sent from this sending section corresponds to the ITU grid number C12, that the optical packet the wavelength of which corresponds to the ITU grid number C12 flows to a multiplexing unit to which the number "S0000" is assigned, that the optical packet is outputted from an output port #50 to a receiving section to which the address "0x904050" is assigned, and that this switch route is normally used now.

The third row of this table indicates that a sending section to which the address "K26F9U/0" is assigned is connected to an input port #9 of a demultiplexing unit to which the number "S0004" is assigned, that the wavelength of an optical packet sent from this sending section corresponds to the ITU grid number C6, that at normal time the optical packet the wavelength of which corresponds to the ITU grid number C6 flows to a multiplexing unit to which the number "S0002" is assigned, and that at normal time the optical packet is outputted from an output port #249 to a receiving section to which the address "K27F9U/0" is assigned. However, the third row of this table indicates that an abnormality in temperature is occurring now and that this switch route is not used.

FIG. 16 is a view showing an example of the input-side collision management table. In this example, a table corresponds to a 256×256 switch and relates to a collision which occurs on the input side of one demultiplexing unit. An input-side collision management table T2 includes Input-Side Collision Group, Input Port Number Priority 1, Input Port Number Priority 2, . . . , and Input Port Number Priority N items.

The following can be seen from the input-side collision management table T2. For example, input ports #1 through #4 form a group 1 included under the Input-Side Collision Group item. Optical packets cannot be sent to the input ports #1 through #4 at the same time. Therefore, if send requests are made and more than one input port of the input ports #1 through #4 is used, then the input ports #1 through #4 are selected in descending order of priority, that is to say, in that order.

When a plurality of sending sections make send requests to send an optical packet in a same time slot, the scheduler 40 detects input ports of demultiplexing couplers (demultiplexing units) to which the plurality of sending sections that make the send requests are connected on the basis of the connection management table T1. In addition, the scheduler 40 determines on the basis of the input-side collision management table T2 whether the input ports detected belong to a same input-side collision group.

If the input ports detected belong to a same input-side collision group, then the scheduler 40 controls the timing at which the plurality of sending sections send optical packets in accordance with priorities assigned to the input ports. As a result, the plurality of sending sections sends the optical packets in descending order of priority of input port connected.

FIG. 17 is a view showing an example of the output-side collision management table. In this example, a table corresponds to a 256×256 switch and relates to a collision which occurs on the output side of one multiplexing unit. An output-side collision management table T3 includes Output-Side Collision Group, Output Port Number Priority 1, Output Port Number Priority 2, . . . , and Output Port Number Priority N items.

The following can be seen from the output-side collision management table T3. For example, output ports #1 and #2 form a group 1 included under the Output-Side Collision Group item. Optical packets cannot be outputted from the output ports #1 and #2 at the same time. Therefore, the output ports #1 and #2 are selected in descending order of priority, that is to say, in that order.

When a plurality of sending sections make send requests to send an optical packet in a same time slot, the scheduler 40 recognizes receiving sections which are to receive optical packets sent from the plurality of sending sections from the send requests and detects output ports of multiplexing couplers (multiplexing units) to which the receiving sections recognized are connected on the basis of the connection management table T1.

The scheduler 40 determines on the basis of the output-side collision management table T3 whether the output ports detected belong to a same output-side collision group. If the output ports detected belong to a same output-side collision group, then the scheduler 40 controls the timing at which the plurality of sending sections send optical packets in accordance with priorities assigned to the output ports. As a result, the optical packets are outputted from the output ports in descending order of priority of output port.

A modification will now be described. In the above examples, SOAs are used as gate elements to be turned on/off. However, other switching elements may be used. For example, electro-optic (EO) polarization elements using lithium niobate (LN or $LiNbO_3$), optical switches using plumb lanthanum zirconate titanate (PLZT), phased array switches using gallium arsenide (GaAs), or the like may be used.

Figure 18:
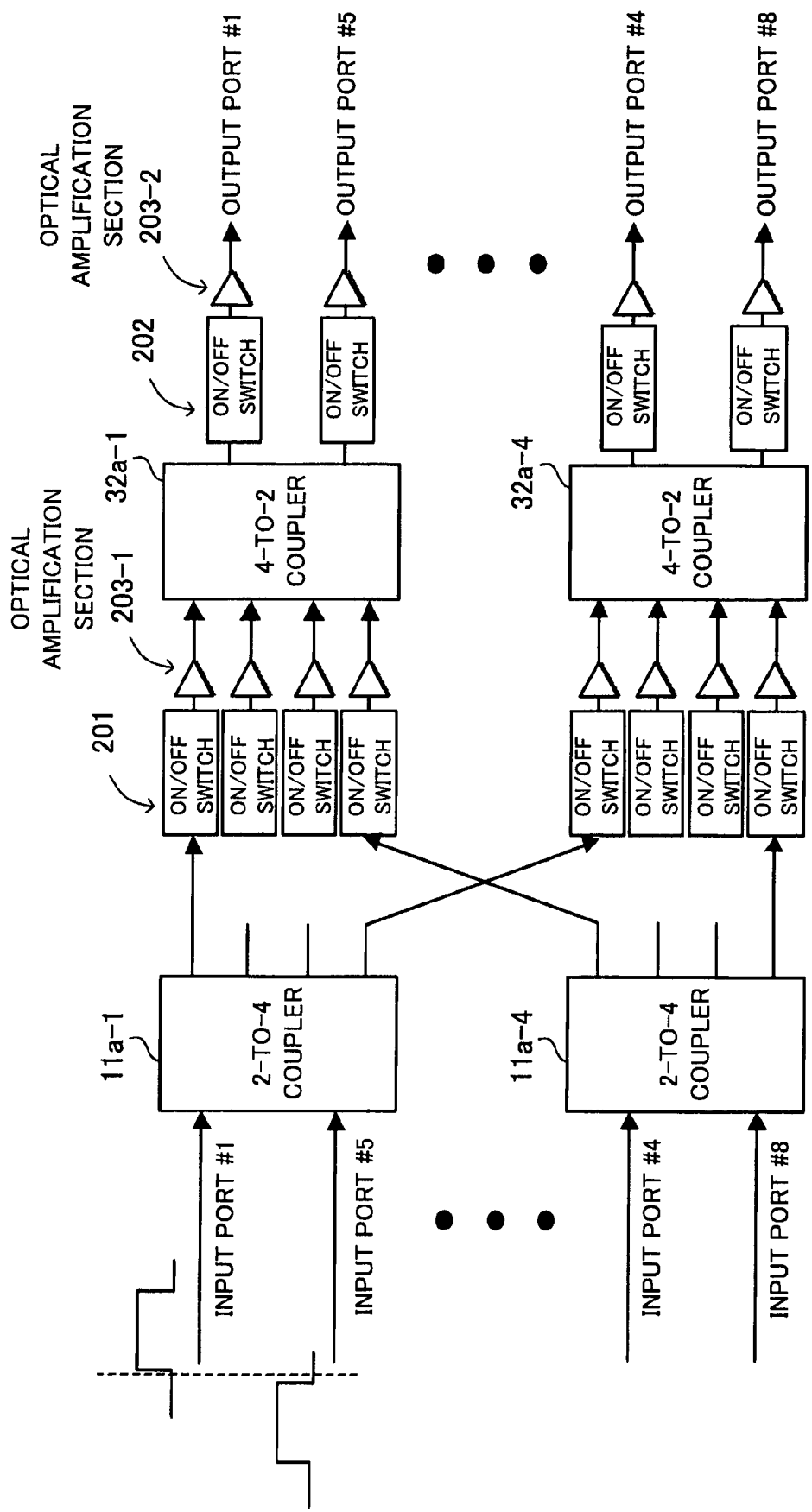
FIG. 18 is a view showing the structure of a modification.

FIG. 18 is a view showing the structure of a modification. In this example, switching elements other than SOAs are used in an 8×8 switch (scheduler 40 is not shown). Unlike SOAs, ON/OFF switches, such as PLZT optical switches or phased array switches, do not have optical amplification functions. Therefore, if ON/OFF switches, such as PLZT optical switches or phased array switches, are used in place of SOAs, an optical amplification section is located at the next stage of each switching element.

That is to say, 16 ON/OFF switches 201 are located in a switch fabric section. 16 optical amplification sections 203-1 are located at the next stage of the ON/OFF switches 201. 8 ON/OFF switches 202 are located at the output stage of 4-to-2 couplers 32*a*-1 through 32*a*-4 and 8 optical amplification sections 203-2 are located at the next stage of the ON/OFF switches 202. The optical switching device 1 may have such a structure.

As has been described in the foregoing, the number of the ports of the optical switch according to the present invention is the same as that of a conventional optical switch. In addition, with the optical switch according to the present invention transmission loss can be improved because of a decrease in the number of signal components into which a demultiplexing coupler demultiplexes an optical signal. As a result, specifications for the characteristics of an optical switching element included in an optical switch can be relaxed significantly. Furthermore, compared with a conventional optical switch, the size of the optical switch according to the present invention can be reduced significantly and the costs of the optical switch according to the present invention can be cut significantly.

In addition, if the optical switching device 1 according to the present invention is applied, an optical switch having a small number of ports is installed at the beginning. When the number of connection ports becomes insufficient, it is easy to expand the scale of the optical switch later. That is to say, the number of ports can flexibly be expanded and it is possible to easily expand the scale of a switch without replacing the device.

The optical switching device according to the present invention comprises an optical demultiplexing section with $2^n$ input ports and $2^m$ (m>n) output ports including demultiplexing couplers, a switch fabric section including optical gate elements for switching optical packets outputted from the optical demultiplexing section by switch drive control, an optical multiplexing section with $2^m$ input ports and $2^n$ output ports including multiplexing couplers for multiplexing the optical packets which pass through the optical gate elements, and a scheduler for exercising control over an entire optical packet switching process. By adopting the optical switching device having the above structure, the number of switching elements can reduced, the scale of an optical switch can be reduced, and the costs of an optical switch can be cut. Even if the number of connection ports is increased, the scale of an optical switch can easily be expanded.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An optical switching device for switching optical packets, the device comprising:
   an optical demultiplexer with $2^n$ (n=1, 2, 3, . . . ) input ports and $2^m$ (m>n) output ports including demultiplexing couplers to demultiplex input optical packets;
   a switch fabric including optical gate elements to switch optical packets output from the optical demultiplexer by switch drive control;
   an optical multiplexer with $2^m$ input ports and $2^n$ output ports including multiplexing couplers to multiplex the optical packets which pass through the optical gate elements;
   a scheduler to exercise control over an entire optical packet switching process;
   senders coupled to the input ports of the demultiplexing couplers to send an optical packet in accordance with instructions from the scheduler; and
   receivers coupled to the output ports of the multiplexing couplers to receive an optical packet after switching;
   wherein the scheduler has:
   a connection management table in which how the senders and the input ports of the demultiplexing couplers are coupled, how the receivers and the output ports of the multiplexing couplers are coupled, and a present state of use of switch routes are dynamically registered;
   an input-side collision management table in which an input-side collision group formed by considering input ports of a same demultiplexing coupler as one collision group and a priority assigned to each input port included in the input-side collision group are registered; and
   an output-side collision management table in which an output-side collision group formed by considering output ports of a same multiplexing coupler as one collision group and a priority assigned to each output port included in the output-side collision group are registered.

2. The optical switching device according to claim 1, wherein when the optical switching device is used as an N×N switch with N ($N=2^k$, k=3, 4, 5, . . . ) inputs and N outputs:
   the optical demultiplexer includes $2^{k-n}$ demultiplexing couplers each having $2^n$ (n<k) input ports and $2^{k-n}$ ($=2^k/2^n$, k−n=m) output ports;
   the switch fabric includes ($2^{k-n} \times 2^{k-n}$) optical gate elements; and
   the optical multiplexer includes $2^{k-n}$ multiplexing coupler each having $2^{k-n}$ input ports and $2^n$ output ports.

3. The optical switching device according to claim 2, wherein when the $2^{k-n}$ demultiplexing couplers included in the optical demultiplexer are referred to as demultiplexing couplers $A_1$ through $A_p$ ($p=2^{k-n}$) respectively, output terminals of one of the demultiplexing couplers $A_1$ through $A_p$ are referred to as output terminals $c_1$ through $c_p$, and fabrics formed by every p optical gate elements included in the switch fabric are referred to as fabrics $B_1$ through $B_p$, the demultiplexing couplers $A_1$ through $A_p$ and the fabrics $B_1$ through $B_p$ are connected so that $2^{k-n}$ output terminal $c_h$ ($1 \leq h \leq p$) of the demultiplexing couplers $A_1$ through $A_p$ are coupled to optical gate elements, respectively, of the fabric $B_h$ ($1 \leq h \leq p$).

4. The optical switching device according to claim 1, wherein:
   first optical amplifiers to constantly amplify input light are located at output stages, input stages, or input and output stages of the demultiplexing couplers;
   second optical amplifiers to perform optical amplification in accordance with instructions from the scheduler are located at output stages, input stages, or input and output stages of the multiplexing couplers; and
   the scheduler couples any input and output ports by giving drive instructions only to an optical gate element and a second optical amplifier through which an optical packet passes at switching time.

5. The optical switching device according to claim 1, wherein when a plurality of optical packets are switched to a same output port of a multiplexing coupler and are outputted, the scheduler controls timing at which the senders send the plurality of optical packets to prevent the plurality of optical packets inputted to the demultiplexing couplers from overlapping in a same input time slot and to output the plurality of optical packets in order from the same output port of the multiplexing coupler.

6. The optical switching device according to claim 1, wherein when the scheduler recognizes a state in which optical packets are sent from a plurality of senders that share a same demultiplexing coupler in a same time slot or a state in which optical packets are sent to a plurality of receivers that share a same multiplexing coupler in a same time slot from contents of send requests made by the senders, the scheduler controls timing at which the plurality of senders send the optical packets so that the optical packets sent from the plurality of senders do not overlap.

7. The optical switching device according to claim 1, wherein when a plurality of senders make send requests to send an optical packet in a same time slot:
   the scheduler detects input ports of demultiplexing couplers to which the plurality of senders that make the send requests are coupled on the basis of the connection management table;
   the scheduler determines on the basis of the input-side collision management table whether the input ports detected belong to a same input-side collision group; and
   when the input ports detected belong to a same input-side collision group, then the scheduler controls timing at which the plurality of senders send optical packets in accordance with priorities assigned to the input ports so that the plurality of senders sends the optical packets in descending order of priority of input port coupled.

8. The optical switching device according to claim 1, wherein when a plurality of senders make send requests to send an optical packet in a same time slot:

the scheduler recognizes receivers which are to receive optical packets sent from the plurality of senders from the send requests;

the scheduler detects output ports of multiplexing couplers to which the receivers recognized are coupled on the basis of the connection management table;

the scheduler determines on the basis of the output-side collision management table whether the output ports detected belong to a same output-side collision group;

if the output ports detected belong to a same output-side collision group, then the scheduler controls timing at which the plurality of senders send optical packets in accordance with priorities assigned to the output ports so that the optical packets are outputted from the output ports in descending order of priority of output port.

* * * * *